(12) United States Patent
Beeston et al.

(10) Patent No.: US 10,126,791 B2
(45) Date of Patent: Nov. 13, 2018

(54) CONFIGURABLE POWER MANAGEMENT INTEGRATED CIRCUIT

(71) Applicant: PROGRANALOG CORP., Beaverton, OR (US)

(72) Inventors: Roger Beeston, Portland, OR (US);
Phillip Fischer, Campbell, CA (US);
Robert Fite, Olympia, WA (US)

(73) Assignee: PROGRANALOG CORP., Tualatin, OR (US)

( * ) Notice: Subject to any disclaimer, the term of this patent is extended or adjusted under 35 U.S.C. 154(b) by 0 days.

(21) Appl. No.: 14/932,898

(22) Filed: Nov. 4, 2015

(65) Prior Publication Data

US 2016/0124478 A1  May 5, 2016

Related U.S. Application Data

(60) Provisional application No. 62/075,117, filed on Nov. 4, 2014.

(51) Int. Cl.
*G06F 1/32*  (2006.01)
*G06F 1/26*  (2006.01)
*G06F 1/28*  (2006.01)

(52) U.S. Cl.
CPC ............ *G06F 1/26* (2013.01); *G06F 1/28* (2013.01); *G06F 1/3203* (2013.01); *G06F 1/3296* (2013.01)

(58) Field of Classification Search
CPC ............................... G06F 1/26; G06F 1/3203
USPC ............................................... 713/300
See application file for complete search history.

(56) References Cited

U.S. PATENT DOCUMENTS

| 5,880,598 | A | 3/1999 | Duong |
| 6,529,041 | B1 * | 3/2003 | Ng .................. H03K 19/17744 326/38 |
| 7,032,190 | B2 * | 4/2006 | Auracher ............ G06F 17/5054 257/E27.107 |
| 7,392,498 | B1 | 6/2008 | Srinivasan et al. |
| 7,581,198 | B2 | 8/2009 | Huynh et al. |

(Continued)

OTHER PUBLICATIONS

TPS 65218 data sheet Power Management for AM335x/AM437x ARM® Cortex™—A8/A9 SOCs.*

(Continued)

*Primary Examiner* — Jaweed A Abbaszadeh
*Assistant Examiner* — Volvick Derose
(74) *Attorney, Agent, or Firm* — Haynes and Boone, LLP.

(57) ABSTRACT

In accordance with aspects of the present invention, a programmable power management integrated circuit is presented. An integrated circuit can include a plurality of cells, each cell including at least one driver for a switchable element; and a switch matrix and controller coupled to the plurality of cells, the switch matrix and controller being programmable to configure at least one power channel, each power channel including at least one cell of the plurality of cells. A method of providing a power management system using the integrated circuit includes receiving power requirements corresponding to a target device; providing implementation options to achieve the power requirements; selecting a solution from the implementation options; generating a programming file for a power management integrated circuit, and generating a printed circuit board design for the power management integrated circuit.

36 Claims, 29 Drawing Sheets

(56) References Cited

U.S. PATENT DOCUMENTS

| | | | |
|---|---|---|---|
| 7,770,142 B1* | 8/2010 | Shmayovitsh | G06F 17/5036 716/109 |
| 8,079,007 B2 | 12/2011 | Huynh et al. | |
| 8,341,582 B2 | 12/2012 | Huynh et al. | |
| 8,581,610 B2* | 11/2013 | Miller | G01R 31/2889 324/500 |
| 2002/0130687 A1* | 9/2002 | Duesman | G11C 5/06 326/101 |
| 2004/0124877 A1* | 7/2004 | Parkes | H03K 19/17784 326/41 |
| 2004/0172603 A1* | 9/2004 | Collmeyer | G06F 17/50 716/139 |
| 2005/0200342 A1 | 9/2005 | Rudiak | |
| 2006/0107228 A1* | 5/2006 | Holzbauer | G06F 17/248 715/780 |
| 2008/0083936 A1* | 4/2008 | Huynh | G06F 17/5072 257/203 |
| 2008/0084743 A1* | 4/2008 | Grant | G11C 5/025 365/185.08 |
| 2008/0086710 A1* | 4/2008 | Huynh | G06F 17/5072 716/119 |
| 2008/0127014 A1* | 5/2008 | Pandey | G06F 17/5045 716/103 |
| 2009/0201713 A1* | 8/2009 | Shin | G11C 17/16 365/96 |
| 2010/0199246 A1* | 8/2010 | Huynh | G06F 17/5063 716/118 |
| 2011/0028845 A1* | 2/2011 | Haider | A61B 8/0883 600/459 |
| 2011/0106286 A1* | 5/2011 | Lupetini | G05B 13/026 700/103 |
| 2011/0115436 A1* | 5/2011 | Zhang | B60L 11/1861 320/134 |
| 2011/0273219 A1* | 11/2011 | Marotta | H03K 3/35613 327/333 |
| 2012/0040712 A1* | 2/2012 | Toms | G06F 11/1048 455/550.1 |
| 2013/0151875 A1* | 6/2013 | Huynh | G06F 1/26 713/310 |
| 2013/0242673 A1* | 9/2013 | Luthra | G11C 7/12 365/189.02 |
| 2014/0269020 A1* | 9/2014 | Song | G11C 11/4074 365/154 |
| 2015/0370298 A1* | 12/2015 | Henzler | G06F 13/4221 713/310 |

OTHER PUBLICATIONS

International Search Report for PCT Application No. PCT/US2015/059101 issued by the US Commissioner for Patents dated Jan. 5, 2016, pp. 1-2.

Written Opinion for PCT Application No. PCT/US2015/59101 issued by the US Commissioner for Patents dated Jan. 5, 2016, pp. 1-7.

Power Management for AM335x/AM437x ARM® Cortex™—A8/A9 SOCs. Datasheet; Publication [online] Sep. 2014 [retrieved on Jan. 4, 2016]. retrieved from the Internet: URL: http://datasheet.octopart.com/TPS65218B1PHPT-Texas-Instruments-datasheet-32037711.pdf.

* cited by examiner

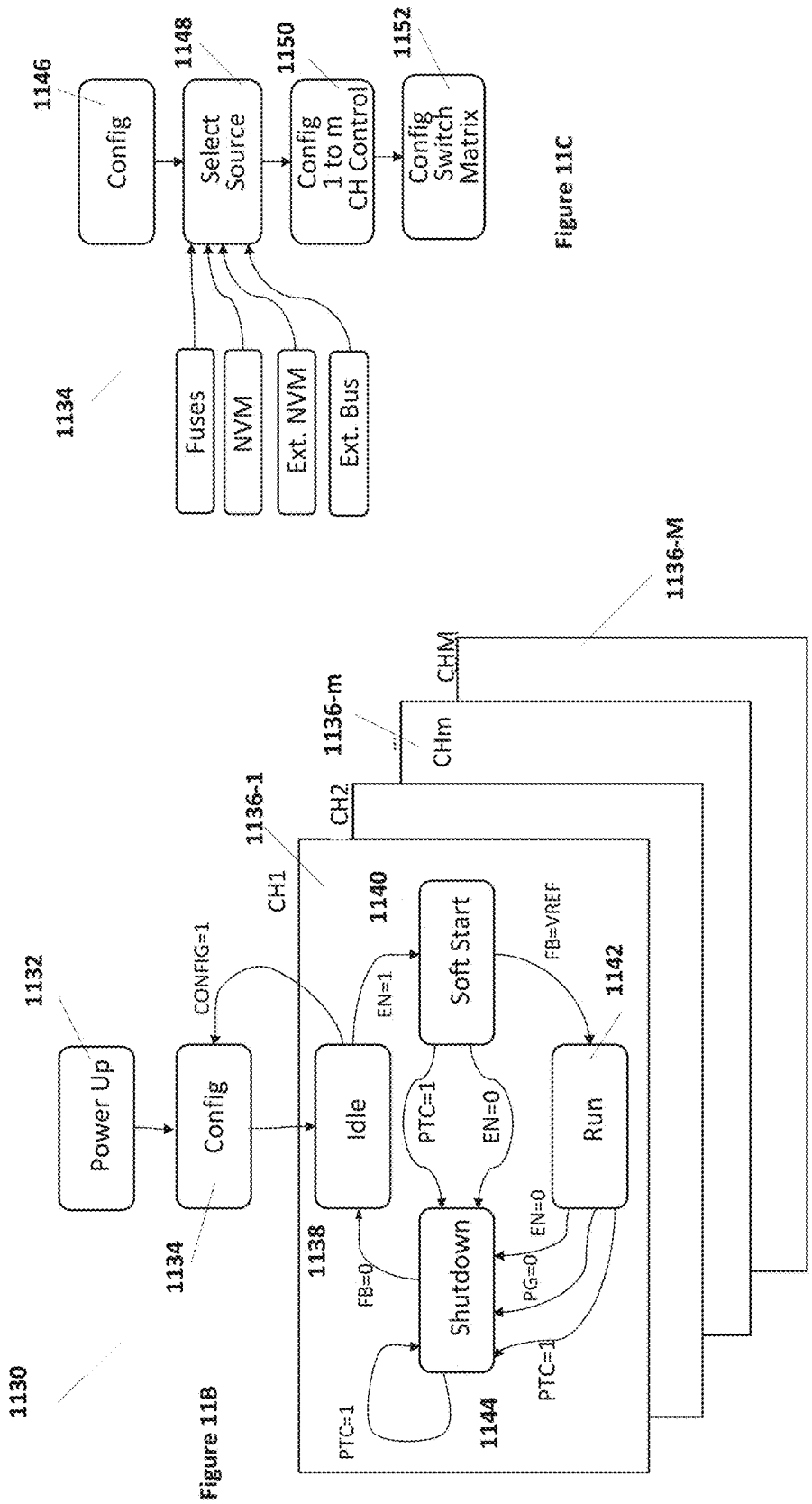

_US 10,126,791 B2_

CONFIGURABLE POWER MANAGEMENT INTEGRATED CIRCUIT

RELATED APPLICATIONS

The present application claims priority to provisional application Ser. No. 62/074,117, filed on Nov. 4, 2014, which is herein incorporated by reference in its entirety.

TECHNICAL FIELD

Embodiments of the present invention are related to power management in integrated circuits and, in particular, to configurable power management integrated circuits.

DISCUSSION OF RELATED ART

A Power Management Integrated Circuit (PMIC) delivers and manages power for a target electronic device or load, such as an Application Specific Standard Product (ASSP) or an Application Specific Integrated Circuit (ASIC). The PMIC provides the multiple rails that power the accompanying ASIC. There are frequently multiple instantiations of ASICs and ASSPs in one system. Collectively, they are sometimes referred to as target devices. ASICs and ASSPs can require in excess of 10 voltage supplies. In addition to providing the power it often manages the power in a variety of different manners.

These loads for different devices often require very sophisticated power supplies. A PMIC integrates a series of individual supplies into one package. Traditionally, the PMIC takes the form of a monolithic slice of die and often accompany a specific ASIC. The high volume nature of ASICs ensures a business case to enable a specific development of a PMIC for a particular ASIC. The result of these two devices being developed in parallel is that unforeseen variables have to be addressed when one or both of the devices return from fabrication and does not work as intended. In order to address these unforeseen changes, the PMIC is frequently required to change, making a "spin" (a redesign and remanufacture) necessary. The "spin" affects time to market of both devices and, in addition, there is an intrinsic cost of re-design and mask sets.

A target device usually has specific power requirements for optimal operation. For this reason, PMICs are generally co-developed alongside a target device. However, power requirements for a target device may significantly change during its development. For example, post-implementation, an ASIC may require changes in its design specification.

However, once manufactured, existing PMIC devices are not able to compensate for changes in power requirements of a co-developed target device. As a result, as discussed above, a PMIC must be redesigned or "spinned" in response to a changed design specification. Redesigning or remanufacturing a PMIC is costly and significantly increases time-to-market for associated packages.

Therefore, there is a need for better designed and more dynamic power management integrated circuits.

SUMMARY

In accordance with aspects of the present invention, a programmable power management integrated circuit is presented. An integrated circuit can include a plurality of cells, each cell including at least one driver for a switchable element; and a switch matrix and controller coupled to the plurality of cells, the switch matrix and controller being programmable to configure at least one power channel, each power channel including at least one cell of the plurality of cells.

In some embodiments, a method of providing a power management system includes receiving power requirements corresponding to a target device; providing implementation options to achieve the power requirements; selecting a solution from the implementation options; generating a programming file for a power management integrated circuit, the power management integrated circuit including a plurality of cells, each cell including at least one switchable element, and a switch matrix and controller coupled to the plurality of cells, the switch matrix and controller being programmable to configure at least one power channel, each power channel including at least one cell of the plurality of cells; and generating a printed circuit board design for the power management integrated circuit.

These and other embodiments are further discussed below with respect to the following figures.

BRIEF DESCRIPTION OF THE DRAWINGS

FIGS. 11B and 11C illustrate a state machine and flow chart of the controller illustrated in FIG. 11A.

DETAILED DESCRIPTION

Figure 1:
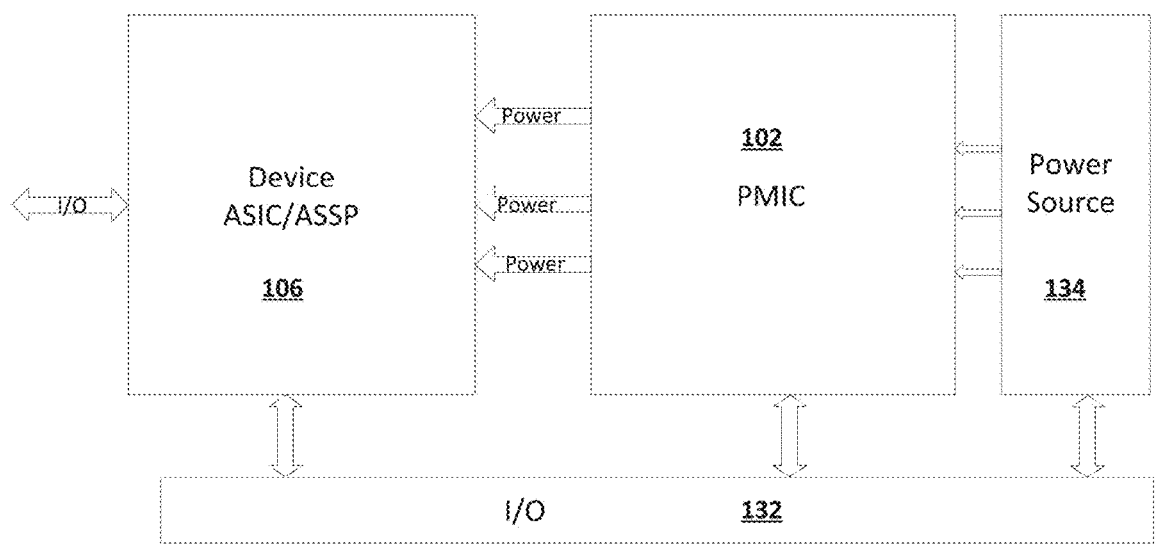
FIG. 1 illustrates a block diagram of an example of a configurable power management integrated circuit (PMIC) used in a system.

In the following description, specific details are set forth describing some embodiments of the present invention. It will be apparent, however, to one skilled in the art that some embodiments may be practiced without some or all of these specific details. The specific embodiments disclosed herein are meant to be illustrative but not limiting. One skilled in the art may realize other elements that, although not specifically described here, are within the scope of this disclosure.

This description and the accompanying drawings that illustrate inventive aspects and embodiments should not be taken as limiting—the claims define the protected invention. Various changes may be made without departing from the scope of this description and the claims. In some instances, well-known structures and techniques have not been shown or described in detail in order not to obscure the invention.

Elements and their associated aspects that are described in detail with reference to one embodiment may, whenever practical, be included in other embodiments in which they are not specifically shown or described. For example, if an element is described in detail with reference to one embodiment and is not described with reference to a second embodiment, the element may nevertheless be claimed as included in the second embodiment.

Some examples provide an analog and/or digital power management integrated circuit (PMIC) that is configurable to meet the needs of one or more target devices. In some examples, the configurable PMIC includes power switches that are optimized and configured to save power and to provide for accurate telemetry measurements, which may be provided by the configurable PMIC either alone or in conjunction with one or more external components. In some examples, the configurable PMIC may be configured to dynamically characterize network impedance and to adjust based, at least in part, on that characterization. The configurable PMIC may be configured to change network values and/or feedback topology in real time.

Configurable power management integrated circuit (PMIC) systems and methods of configuring and reconfiguring those systems are provided. The configurable PMIC system may include a programmable controller and a printed circuit board (PCB). When changes to the power requirements of the target device or devices occurs, the programmable controller may be re-programmed and/or the PCB may be re-designed to meet the changed power requirements of the target device.

In some examples, the configurable PMIC may be a combination of an analog and a digital programmable fabric System on Chip (SoC), which may perform multiple functions based, at least in part, on customer requirements, such as for one or more target device requirements. For example, the configurable PMIC may include a programmable controller and a PCB, which may each or both be configured to meet target device requirements without, for example, having to change the silicon (Si) of the physical device. The configurable PMIC may be configured for one set of parameters required by the target device, such as an ASIC. However, when design rules and specifications change for the target device, the configurable PMIC may be reconfigured to accommodate for those changes.

FIG. 1 illustrates utilization of a PMIC 102 to power a device 106. Device 106 can be an ASIC or ASSP device, collection of multiple ASIC or ASSP devices, or any other target device or devices considered to be a load. The target device 106 may be a loudspeaker, a magnetic coil used for audio, or an actuator. In some embodiments, PMIC 102 and device 106 may be formed as a single integrated circuit device. As shown in FIG. 1, PMIC 102 receives power from a power source 134. PMIC 102 can be configured to receive any input power, usually a DC power voltage, from any source. Power source 134 can be a battery such as a Li-ion battery, an RTC backup battery, a USB connected source, a wired source such as a rectified 110 V AC plugged source, or any other source of power. In turn, embodiments of PMIC 102 can be configured to supply power at various voltages to device 106. For example, PMIC 102 can be configured to provide power at multiple voltages to device 106. Device 106 can include multiple individual devices, each with differing power requirements. Further, PMIC 102 can be configured to allow appropriate currents for each of the multiple voltages supplied to device 106. Typical voltage levels can up to 5V at allowable currents of up to 10 Amps. Embodiments may be scaled with size so that any voltage and current combination can be provided.

As is further illustrated in FIG. 1, communications between PMIC 102 and device 106 can be provided by an I/O bus 132. In some embodiments, I/O bus 132 may also be coupled to power supply 134. I/O bus 132 can be used to provide any form of communications, including I2C, GPIO, SPi, PWM, USB, or ADC signaling. Further, device 106 can be provided, and may provide power to, several external devices such as a SD storage slot, cameras, or other devices.

As such PMIC 102 provides for the power requirements of device 106. PMIC 102 often supplies multiple rails, each carrying power at a particular voltage and a particular current requirement, that power device 106, and sometimes external devices attached to device 106. In some applications, PMIC 102 can be configured to provide ten (10) or more voltage supplies to device 106. In accordance with embodiments, PMIC 102 can be configured by an external computer to supply the appropriate power to device 106. During development, if device 106 is redefined resulting in different requirements, then PMIC 102 can be configured to address the different requirements without redesigning and reproducing ("spinning") PMIC 102.

In accordance with some embodiments, PMIC 102 provides a very programmable and versatile analog and digital Power Management Integrated Circuit. The versatility of embodiments of PMIC 102 can result in faster time to market solutions with lower cost of development, in circuit Power Train Optimization resulting in solutions with power savings and more accurate measurements, and dynamic load profiling allowing the ability to characterize network impedance dynamically and adjust parameters in a variety of different manners. The benefits of such versatility are numerous, some of which are time to market, stability, solution size and change the network values and/or topology in real time ("Regime Changing").

Embodiments of PMIC 102 can be a combination of analog and programmable fabric System on Chip (SoC) that, based on configuration, can perform multiple functions according to customer requirements. The high degree configurability possible with embodiments of PMIC 102 has at least two aspects: a programmable controller and a PCB layout implementation. These two variables, programmable controller and PCB layout enable the greatest amount of versatility without changing the Silicon (Si) of PMIC 102. For example, a customer can target a solution for one set of parameters required by the ASIC and later, as design rules and specifications change, the power solution can be adjusted to accommodate for the changes without having to "spin" the PMIC 102. Instead, another identical PMIC 102 can be programmed to accommodate the new power solutions without having to redesign PMIC 102 in the process. For example, the system requirements, that may include one or more ASICs and/or ASSPs, can change. The target device may stay the same, but another component of similar or different type may be added or removed from the device.

System level power solutions for PMIC 102 to provide power to device 106 are bounded by voltage, current, size, and thermal and power consumption. Given these constraints, taking a system level input allows for a more elegant engineering approach. The various engineering constraints on PMIC 102 include size, efficiency, input voltage, output voltage, operating temperature, sequencing, current sharing, inrush control, battery charging, and isolation requirements. Input parameters can be input and processed with the use of a computer. The computer further optimizes PCB layout and component choice based on the parameters and the available resources from PMIC 102.

Figure 2:
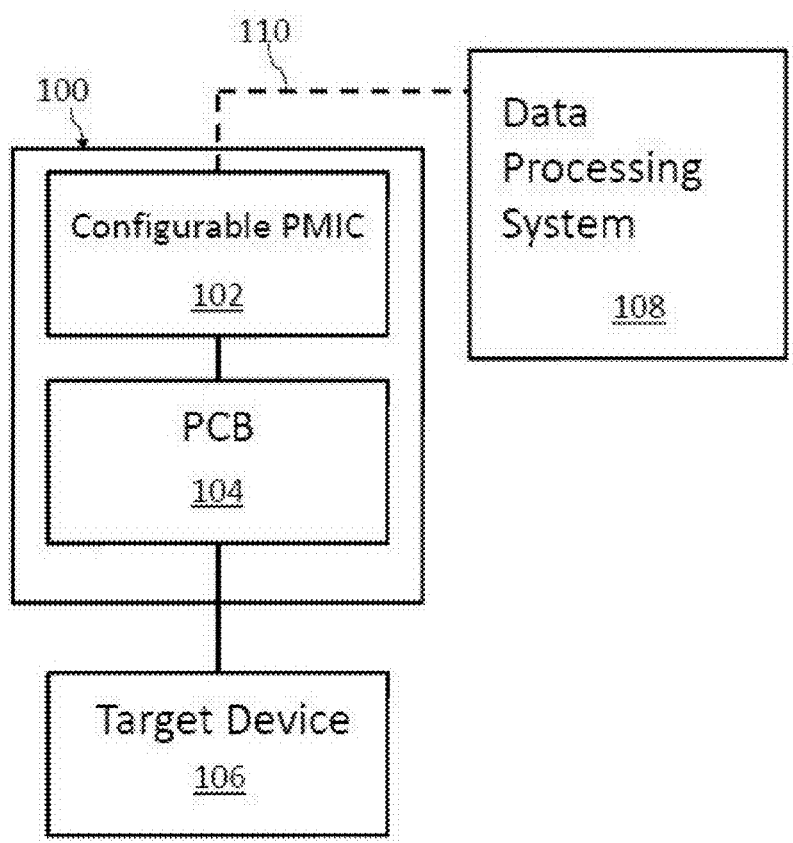
FIG. 2 illustrates a block diagram of an embodiment of a configurable PMIC while being configured.

FIG. 2 shows an example of a configurable power management integrated circuit (PMIC) system 100, which may include any suitable structure configured to provide and/or manage power for target device 106. For example, configurable PMIC system 100 may include a configurable PMIC 102 that is electrically coupled to (or in electrical communication with) a printed circuit board (PCB) 104. The configurable PMIC 102 may be programmed and the routing and/or layout of PCB 104 may be determined based on the requirements of device 106. For example, the configurable PMIC system may provide buck, boost, inverting buck boost, H bridge buck boost, forward, active clamp forward, active diode, flyback, Cuk, single-ended primary-inductor converter (SEPIC), 2 switch flyback, 2 switch forward, half bridge, push-pull, full bridge, phase shifted bridge, and/or other types of conversion required to provide power to device 106. Additionally, layout of the PCB may selectively route one or more components of configurable PMIC 102, such as the analog and digital inputs and outputs. When the requirements of device 106 changes during development of system level validation of device 106, configurable PMIC 102 may be reprogrammed and/or the PCB may be re-routed such that the reconfigured PMIC system 100 meets the new requirements of device 102.

Device 106 may be configured to be mounted and/or otherwise attached to PCB 104, which may allow configurable PMIC 102 to provide and/or manage power to target device 106. Alternatively, in some embodiments, device 106 and PMIC 102 may be formed as a single IC as a system-on-a-chip (SoC) configuration. Target device 106 may include any suitable device, including Application Specific Standard Products (ASSPs) or Application Specific Integrated Circuits. For example, target device 106 may include a smartphone, a tablet, a netbook, an e-reader, a digital camera, a video camera, or other handheld and/or mobile device. Target device 106 may also be discreet components such as, for example, an audio speaker.

Data processing system 108 may include any suitable structure configured to program and/or reprogram configurable PMIC 102, such as via a connection 110. In some examples, data processing system 108 may receive user inputs regarding platform requirements and configure (or reconfigure) the configurable PMIC 102 based on the received requirements. Data processing system 108 also may receive user inputs regarding platform requirements and generate a PCB layout for manufacturing (or re-wiring) PCB 104. Data processing system 108 may also generate reference configurations based on the identification of established properties of target device 106. The data used to create configurations can be sourced from databases in data processing system 108 or may be source from other networks.

Although a single data processing system 108 is shown, multiple data processing systems may be used. For example, a first data processing system may be used by the user to provide the inputs (e.g., user's data processing system), a second data processing system may be used to receive the user inputs and generate solutions, and a third data processing system may be used to program configurable PMIC 102. Alternatively, the first data processing system may be used both to query the user inputs and to reprogram configurable PMIC 102, such as when the user can reprogram configurable PMIC 102 on site without having to send configurable PMIC 102 to a third party entity for programming.

In some embodiments, PMIC 102 is programmed using internal fuses. In other embodiments, PMIC 102 includes registers or non-volatile memory that store programmed parameters. Embodiments of PMIC 102 that utilize internal fuses can be programmed only once. However, embodiments of PMIC 102 that include internal registers and/or non-volatile memory in place of fuses can be programmed and reprogrammed numerous times.

Figure 3:
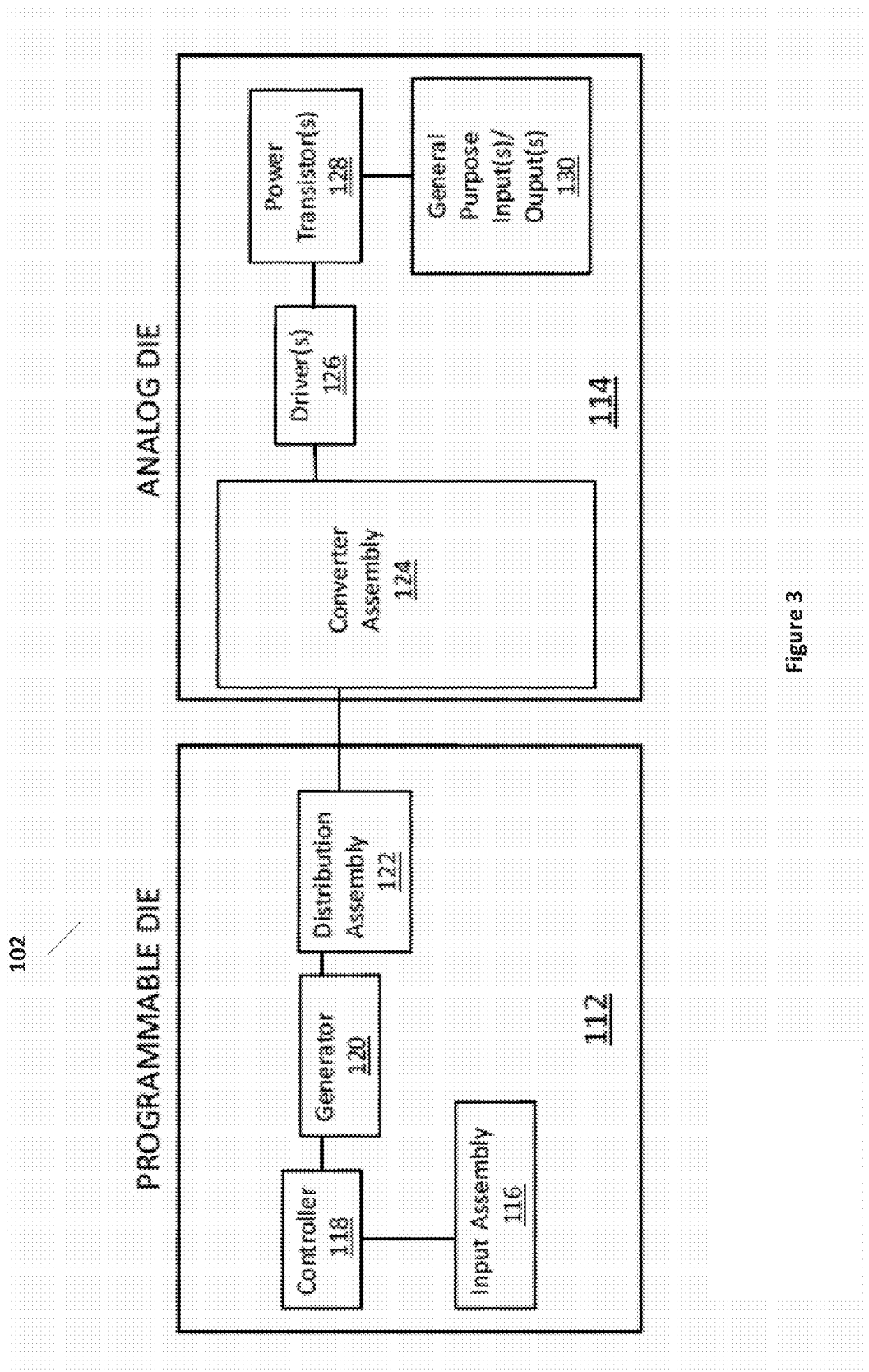
FIG. 3 illustrates an example block diagram of a configurable PMIC that can be used in the PMIC system illustrated in FIG. 1.

FIG. 3 shows an example of configurable PMIC 102, which may include any suitable structure configured to provide and/or manage power to target device 106. In some examples, configurable PMIC 102 may be configured to process data. Configurable PMIC 102 may include a programmable die 112 and an analog die 114. Programmable die 112 and analog die 114 can be positioned in a single IC in any fashion, including side-by-side, top and bottom, or any suitable orientation or layout. Although configurable PMIC 102 is shown to include programmable die 112 connected to or in electrical communication with analog die 114, the configurable PMIC may be a monolithic die, a stacked die, or a multi-chip module.

Programmable die 112 may include an input assembly 116, a controller 118, a generator 120, and a distribution assembly 122. Input assembly 116 may include any suitable structure configured to receive inputs from data processing system 108. For example, input assembly 116 may include a connector (not shown) that allows a user to connect programmable die 112 with data processing system 108 allowing the controller and/or the programmable die to be programmed (or re-programmed) based on user inputs received by the data processing system. Controller 118 may include any suitable structure configured to receive inputs from input assembly 116 and to control generator 120 and/or distribution assembly 122 based, at least in part, on the received inputs.

Generator 120 may include any suitable structure configured to generate signals adapted to switch power transistors on or off, such as pulse-width modulation (PWM) signals. The generator may vary the signal based on frequency and/or duty cycle. In some examples, generator 120 may toggle between two or more signals with courser duty cycles to generate a more accurate signal. When generator 120 generates PWM signals, the generator may be referred to as a "PWM generator 120." Distribution assembly 122 may include any suitable structure configured to distribute and/or regulate the generated signals to one or more components of analog die 114, such as the driver(s) and/or the power transistors. Programmable die 112 may include one or more other components not shown in FIG. 2, such as analog to digital converters (ADCs), digital to analog converters (DACs), inductors, capacitors, switchable elements such as gate arrays and registers that control switching and processing of data between ADCs and DACs, and other components.

Analog die 114 may, for example, include a converter assembly 124, driver(s) 126, power transistor(s) 128, and general purpose input(s)/output(s) 130. The converter assembly may include any suitable structure configured to convert one or more signals from the programmable die. For example, converter assembly 124 may include one or more analog to digital converters (ADCs), one or more digital to analog converters (DACs), etc.

Driver(s) 126 may include any suitable structure configured to drive and/or direct one or more power transistors 128. The drivers may be programmable based, at least in part, on the signals received from programmable die 102. For example, one or more characteristics of the drivers may be programmable, such as slew rate, dead time, and output current. In some examples, drivers 126 may be configured to drive power transistors 128 in a controlled manner in the conduction regions to allow, for example, in rush control. When drivers 126 drive field effect transistors, the drivers may be referred to as "FET drivers 126."

Power transistors 128 may include any suitable structure configured to switch based on received signals from the programmable die and/or drivers. For example, power transistors 128 may include bi-polar transistors and/or field effect transistors (FETs). The power transistors may be arranged and/or positioned in any suitable manner and/or configuration. For example, two or more power transistors 128 may be arranged in a parallel configuration, which may provide additional power to the target device. Alternatively, the power transistors may be implemented in a multi-phase manner. General purpose input(s)/output(s) 130 may include any suitable structure configured to provide input/output ports for analog die 114. For example, the general purpose input(s)/output(s) may include a plurality of pins configured to receive input and provide output to one or more electronic components, such as a processor, or analog signals from an ADC or other controller signal chain Analog die 114 may include one or more other components not shown in FIG. 3.

In some examples, the configurable PMIC may include a powertrain that is optimized and configured to save power and to provide for accurate telemetry measurements. For example, the configurable PMIC 102 may include one or more response monitors (not shown) that are configured to detect and/or determine various characteristics of a target device 106. Such monitoring may, for example, optimize power delivery efficiency. For example, the response monitor(s) may detect for a target load, transistor switching variations, inductor temperature, CMOS and/or PCB tolerance variations, impedance, high current per time events, frequency range for optimizing noise and jitter, power modes, and/or other characteristics. In some examples, the response monitor(s) may determine characteristics of its own power delivery components (such as its powertrain). For example, the response monitor(s) may detect impedance, DC resistance, inductance (L), switching frequency, inductor ripple current, current, duty cycle, output voltage variance, component tolerances, temperature, and/or other characteristics.

External Power Train Components 602, 604 and their associated real values, as opposed to purported values, can be determined with a series of steps that allow for determining their characteristics. Steps can include disabling the load coupled to power rail 606 by disabling device 106, for example with an enable pin via GPIO, to establish a static load impedance. Asserting a number of PWM switching activities of transistors 510 and 512 through 602 and 604. Measuring the results of output voltage, current and duty cycle pulse size. Real values of 602, 604 can be established by measuring rise, steady state and fall times of current and voltage. Additional environmental inputs, such as temperature, can be evaluated to offer greater resolution.

The response monitor(s) may determine the above target load and powertrain characteristics when the load is running in normal mode, or enabled. Measuring voltage, current and duty cycle allows for repeated load operations to be characterized and detected by PMIC 102.

The response monitor(s) may determine the above target load and powertrain characteristics in various ways, such as via analog control feedback loops, a Digital Signal Processor (DSP), by measuring and comparing deviations from a steady state of operation and/or transceivers. The response monitor(s) may record such characteristics onboard and generate a reference table and/or a power profile. Alternatively response monitor(s) may record such characteristics onboard and generate a reference table and/or a power profile using processing system 108 or a combination of the system 108 and a processor on PMIC 102. The response monitor(s) also may detect power modes of a target device, such as sleep, standby, and/or low-power modes.

Once the target load and powertrain characteristics are determined, the configurable PMIC may deliver power to a target device according to a learned profile. For example, the configurable PMIC may adjust delivered power via integrating additional switching and/or PWM frequencies, and adjusting PWM duty cycle rates and/or frequencies. In some examples, the above processes may take place before a target device is powered on to ensure optimal power delivery and stability. In some examples, the configurable PMIC 102 may be configured to dynamically characterize network impedance and to adjust based, at least in part, on that characterization. For example, the PMIC 102 may be configured to change network values and/or feedback topology in real time. The configurable PMIC 102 may include one or more load monitor(s) configured to monitor and record values of a plurality of variables, such as transistor switching, temperature, CMOS and/or PCB tolerance variations, properties of the power train (e.g., actual inductance, DCR of the magnetics, etc.), output voltages Vout, output currents Iout, and/or other variables, and generate a load profile based on the recorded data. The load monitor(s) may perform the monitoring and/or recording at any suitable frequency. The load profile may then be used during normal operation of the configurable PMIC, such as in the form of a look up table or the like. One or more components of the configurable PMIC 102 may use the load profile to provide a suitable response to the load(s) from the one or more target devices 106. For example, a nonlinear response may be provided when appropriate. In a multiphase solution, the frequency of each phase may be adjusted, for example, based on differences in tolerances. The load profile may be updated by the load monitor(s) based on periodic and/or continuous monitoring. In some examples, certain loads may provide advanced notice of imminent excursions such that a response based on a learned load profile may provide an effective approach of avoiding such excursions.

Embodiments of PMIC 102 provide a programmable device to drive a grid array of power switches or FETS. The connectivity of the power switches is determined by the layout of the PCB 104 on which PMIC 102 is mounted. Such an arrangement enables a very flexible architecture to address a larger number of applications. The programmable and configurable PMIC 102 is based on two main areas. User defined parameters are input into a computer that is coupled to PMIC 102. The software instructions executed by processor 108 then derive two sets of configuration data. The first set configures a controller fabric of PMIC 102. System processor 108 determines the control of input and output signals to PMIC 102 and programs PMIC 102 accordingly. The computer takes inputs which are either digital or analog and determines how the fabric processes this data and how to output it. Some of the outputs are used to drive the Power FETs (which are routed by changing the layout of PCB 104) with pulse-width modulation (PWM) signals. Other signals that remain more static, such as FET driver strengths, DACs, and ADCs, can also be configured. In some embodiments, analog multiplexing can be used to route signals.

The second set configures the higher current connectivity of the Powertrain (Drain and Sources of PFETS or NFETs or both, bipolar-junction transistors (BJTs), or any other switching elements used in PMIC 102) by connecting the bottom of the package pins to each other through the layers of PCB 104. This connectivity can occur either under PMIC 102, outside PMIC 102, or both. Different permutations of wiring of PCB 104 enable different topologies and power densities to be implemented with only a change to the layout of PCB 104. No Silicon spin is required, thus enabling much faster time to market and resulting in cheaper solutions. A change of PCB 104 is much cheaper and faster to execute than a full redesign of a PMIC.

PMIC 102 can take the form of a multi-chip module with a piece of programmable fabric (Si die) on top or side by side of an analog die 114. The analog die 114 may contain the general purpose input output (GPIO), switches such as power FETs, associated drivers, ADCs and DACs. PMIC 102 may also be implemented on a monolithic slice of die that contains power FETs, programmable fabric, GPIO and FET drivers. In high volume applications the fabric can be hardened (i.e. fixed in production) to allow for cost savings or additional functionality to be added. As such, once the product is validated with its associate load the finalized fabric can be "hardened" and additional IP cores can be added to the now spare Silicon. For example, the addition of an ARM Cortex A9 or alternatively additional die area can be targeted to the power transistors to allow for improved efficiency and thermal performance.

Figure 4:
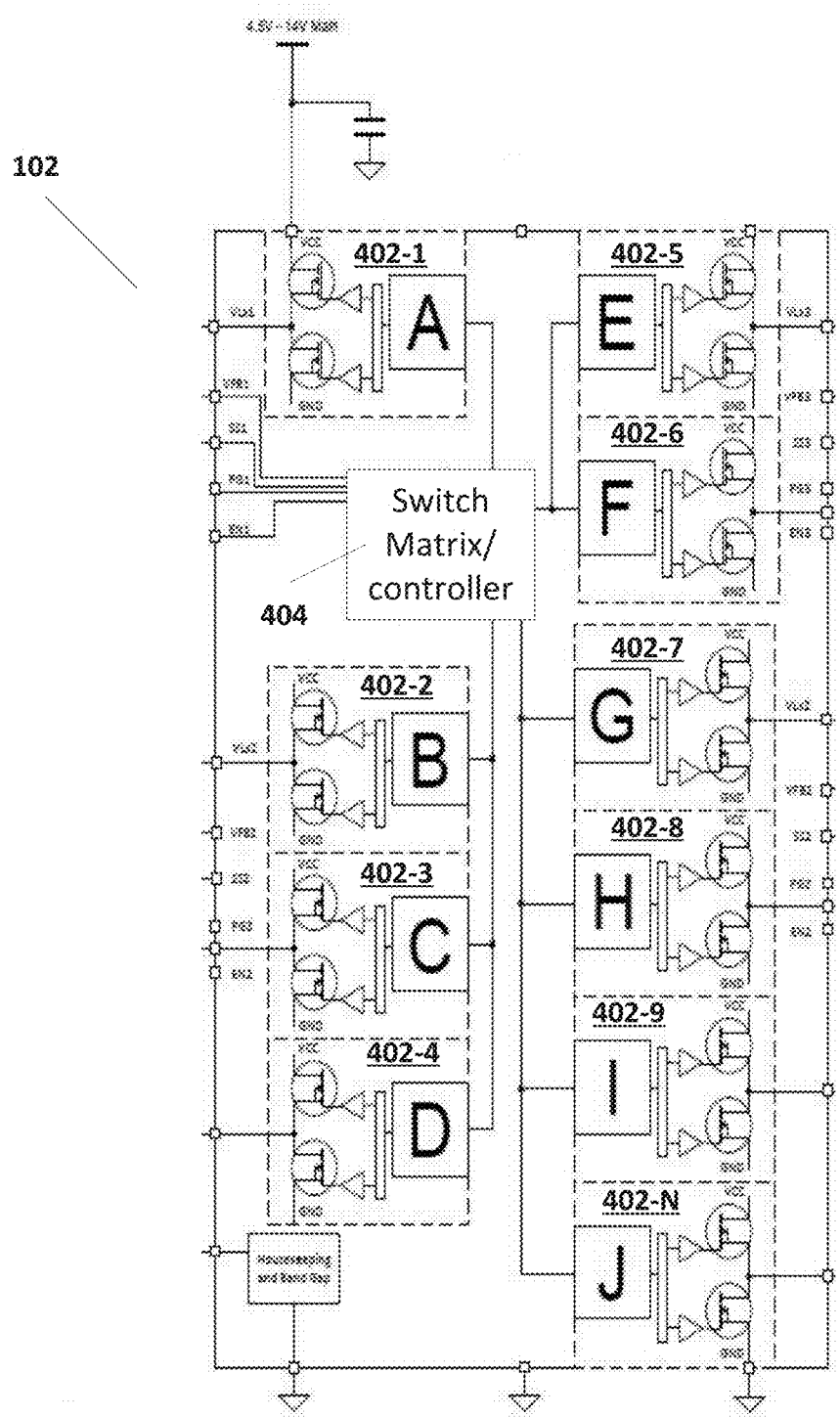
FIG. 4 illustrates a PMIC according to some embodiments.

FIG. 4 illustrates an example of PMIC 102 according to some embodiments. As shown in FIG. 4, PMIC 102 can be formed on a single IC chip with multiple I/O pins. As shown, PMIC 102 includes a plurality of cells 402. In the particular example illustrated in FIG. 4, cells 402-1 through 402-N are represented. N can be any number, for example 10. PMIC 102 further includes a switch matrix and controller 404 coupled to each of cells 402.

Switch matrix and controller 404 can include controller components as well as a switch matrix. In some embodiments, switch matrix and controller 404 can include non-volatile memory, registers, fused programmable elements, or other data storage devices that are used to configure aspects of switch matrix and controller 404.

PMIC 102 includes output pins for each of cells 402. As is discussed further below, these output pins provide signals for external components such as inductors, resistors, capacitors, further transistors or other components that compose a buck, buck-boost, boost, or other such arrangement. Further, cells 402 can be combined by programming switching matrix and controller 404 and by connecting output pins of PMIC 102 on a PCB 104 on which PMIC 102 is mounted.

Figure 5:
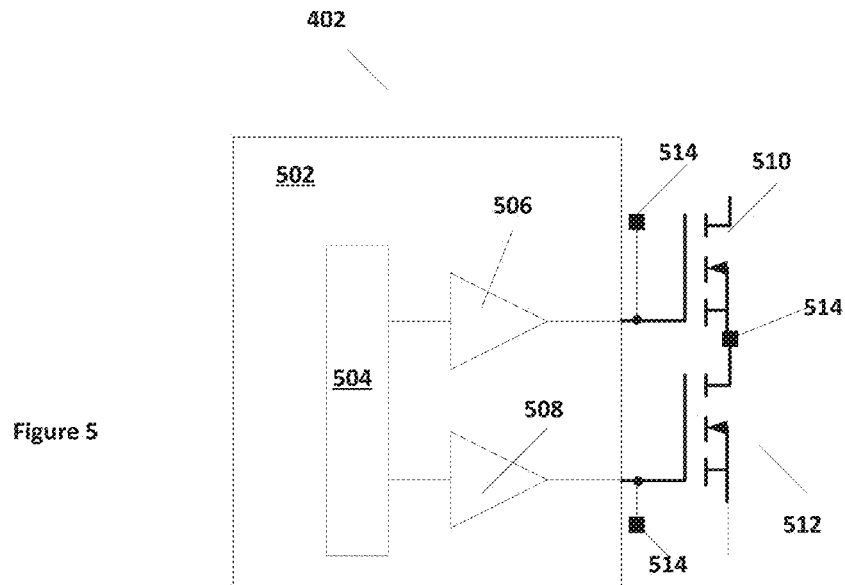
FIG. 5 illustrates a cell according to some embodiments.

FIG. 5 illustrates an example cell 402 according to some embodiments. The embodiment of cell illustrated in FIG. 5 includes FETs 510 and 512 coupled in series and can alternatively be referenced as a "Universal FET cell (UFC)". In some embodiments, switching components other than FETs can be used in cell 402. The gates of FETs 510 and 512 are driven by control circuit 502, which includes drivers 506 and 508, respectively. Drivers 506 and 508 are controlled by cell controller 504. As is further shown in FIG. 5, cell 402 includes connections to one or more I/O pins 514 of PMIC 102.

In some embodiments, cell 402 can replace one of FETs 510 and 512 with a diode. Further, FETs 510 and 512 can be any switching devices, including NMOS or PMOS transistors, diodes, or other device that are capable of switching. In some embodiments, drivers 506 and 508 may be directly coupled to I/O pins 514 of the PMIC 102 in order to drive FETs or other switching devices located outside of PMIC 102. In some embodiments, FETs 510 and 512 may each separately include multiple parallel connected individual FETs, possibly from an alternate element or cell, each of which may be programmably selected in individual cells 402. In that fashion, cell 402 may be programmed to have asymmetric transistors sizes in FET 510 and FET 512. In general, FETs 510 and 512 can be of any sizes and any relative sizes and, as suggested above, the sizes of one or more of FETs 510 and 512 can be programmable.

Figure 6A:
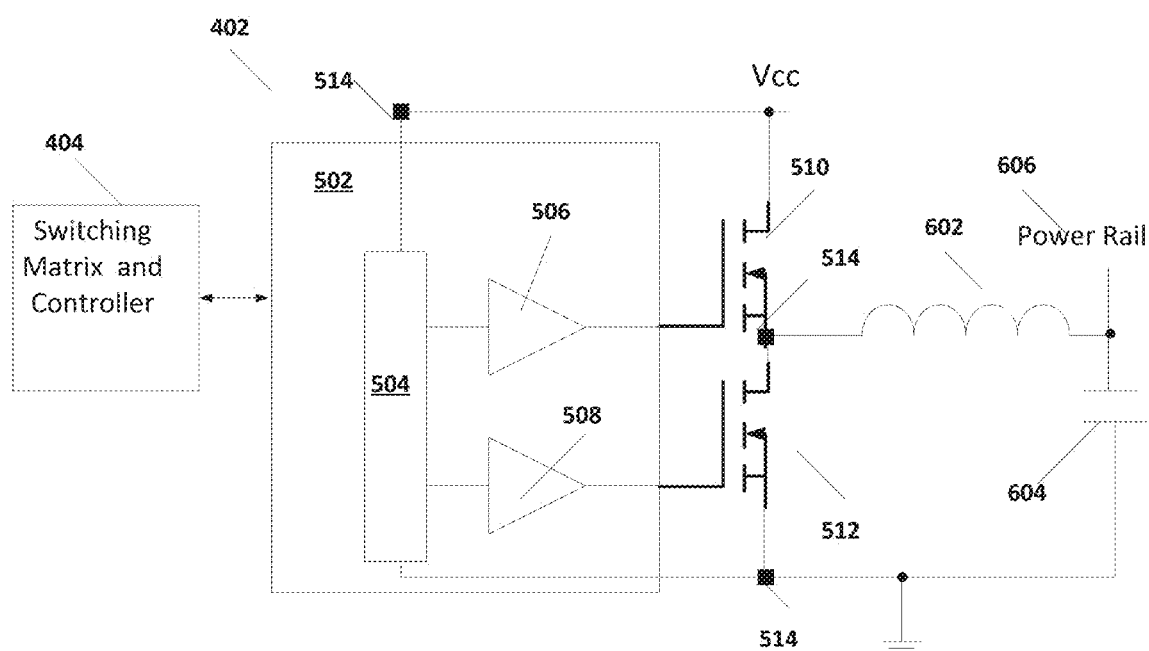
FIGS. 6A through 6H illustrate combinations of cells as illustrated in FIG. 5 to provide various power outputs according to some embodiments.

FIGS. 6A through 6H illustrates configuration of cells 402 in order to provide output power to device 106. As is further illustrated below, cells 402 can be programmably combined in order to provide the required power for each channel. Any number of cells 402 can be combined as illustrated. FIG. 6A illustrates utilization of a single cell 402 in order to drive a buck converter formed by the addition of inductor 602 and capacitor 604. In general, inductor 602 can be any inductor, including a speaker, for example. As is further shown in FIG. 6A, UFC control circuit 502 is coupled to switching fabric and controller 404, which receives feedback signals from control circuit 502 and provides control signals to control circuit 502 to control the power at power rail 606. Power from capacitor 604 is provided at power rail 606, which is input to device 106.

Figure 6B:
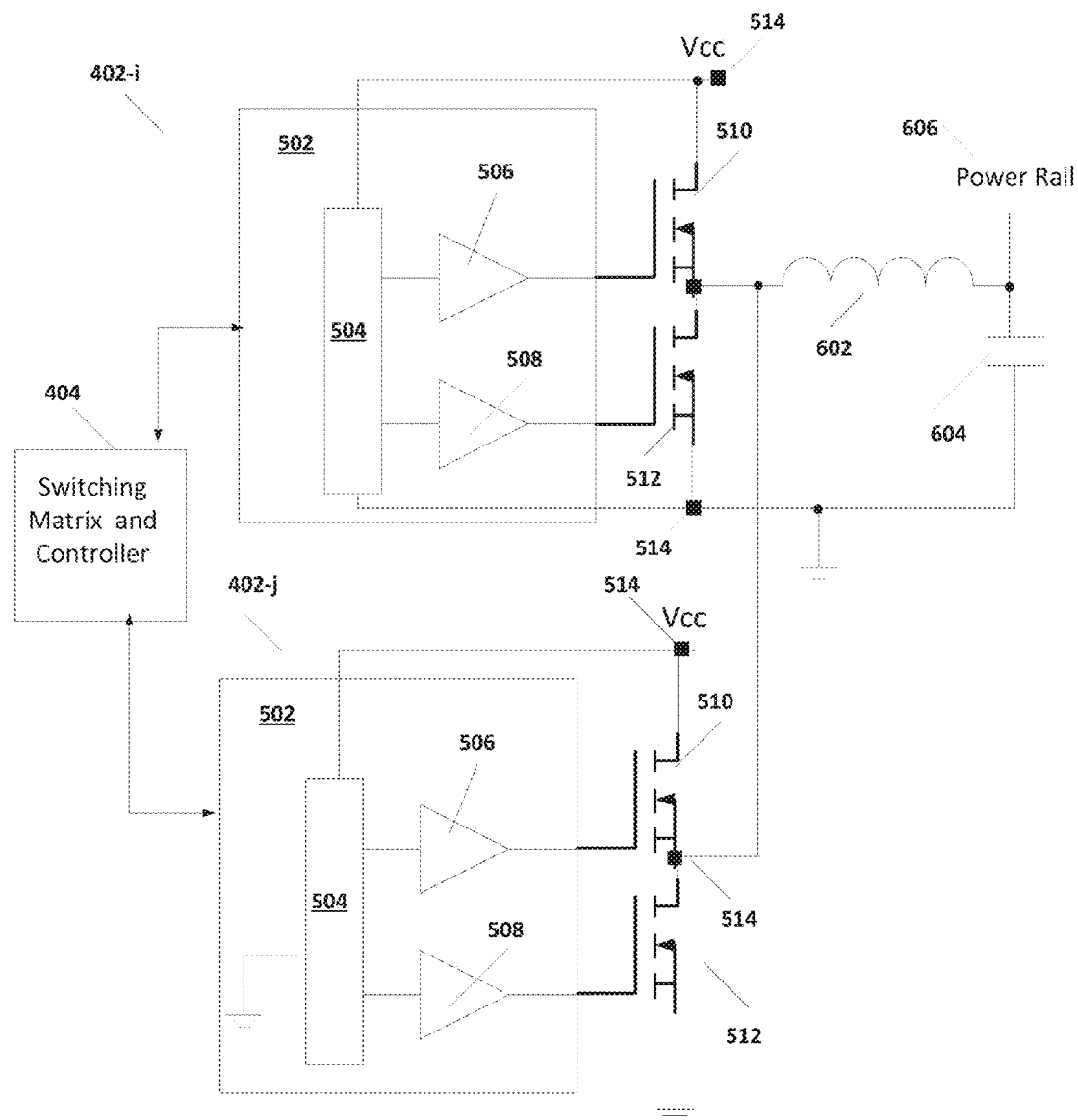

FIG. 6B illustrates combining two cells 402, in this case cell 402-i and cell 402-j and i and j indicate any pair of cells 402 on PMIC 102 or a pair of cells in separate individual chips that form PMIC 102. In general, PMIC 102 can include any number of individual chips on which cells 402 are formed. As is shown in FIG. 6B, inductor 602 is coupled to receive input from both UFC 402-i and cell 402-j. As a result, the power provided at power rail 606 can be greater than if only one of cell 402-i or cell 402-j is used. Switching matrix and controller 404 controls both cell 402-i and cell 402-j in order to control the power output at power rail 606.

Figure 6C:
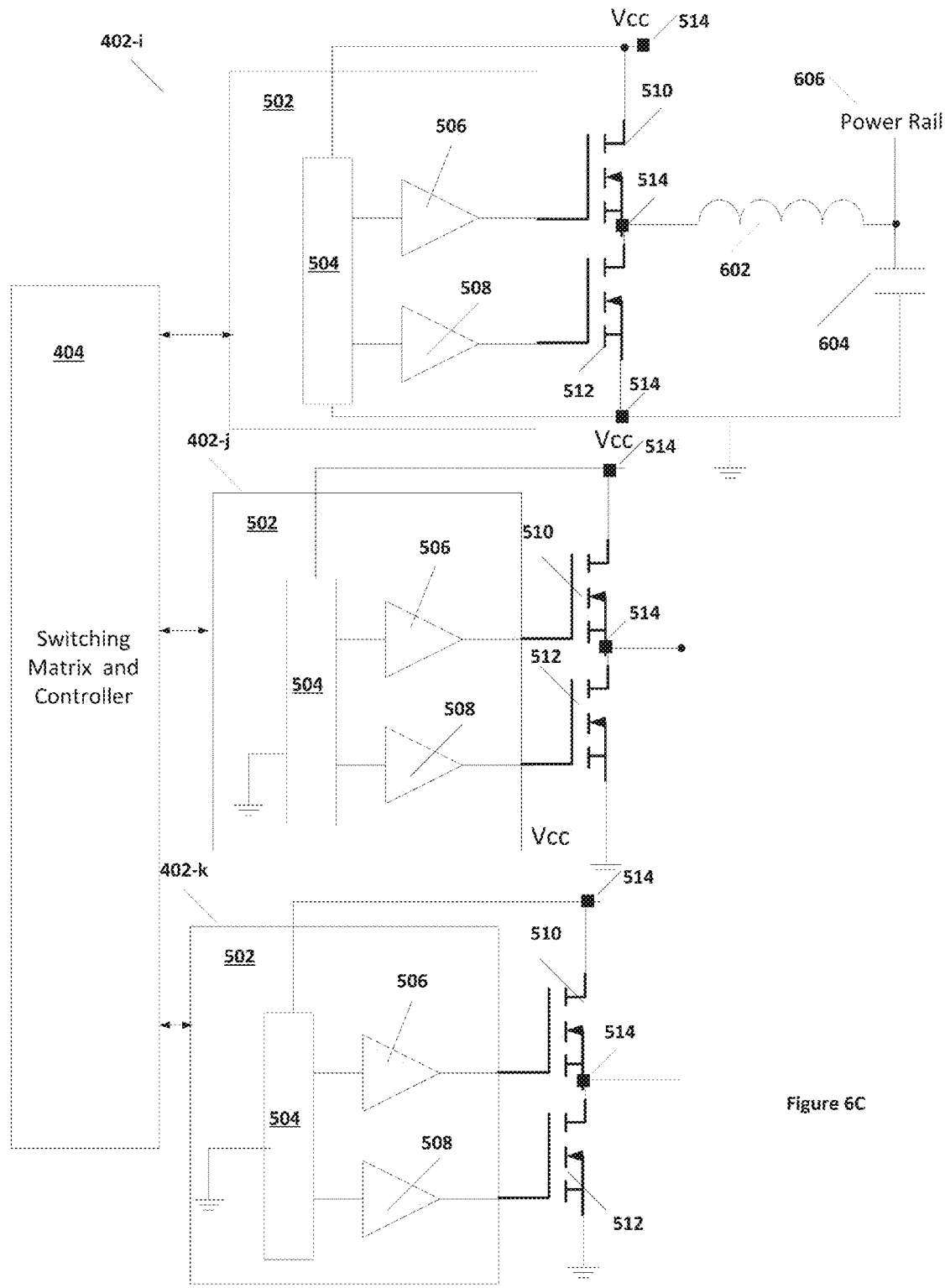

FIG. 6C illustrates combining three cells 402, in this case cell 402-i, cell 402-j and cell 402-k. As is further illustrated, switching matrix and controller 404 controls cell 402-i, cell 402-j and cell 402-k in order to provide the appropriate power at power rail 606.

Figure 6D:
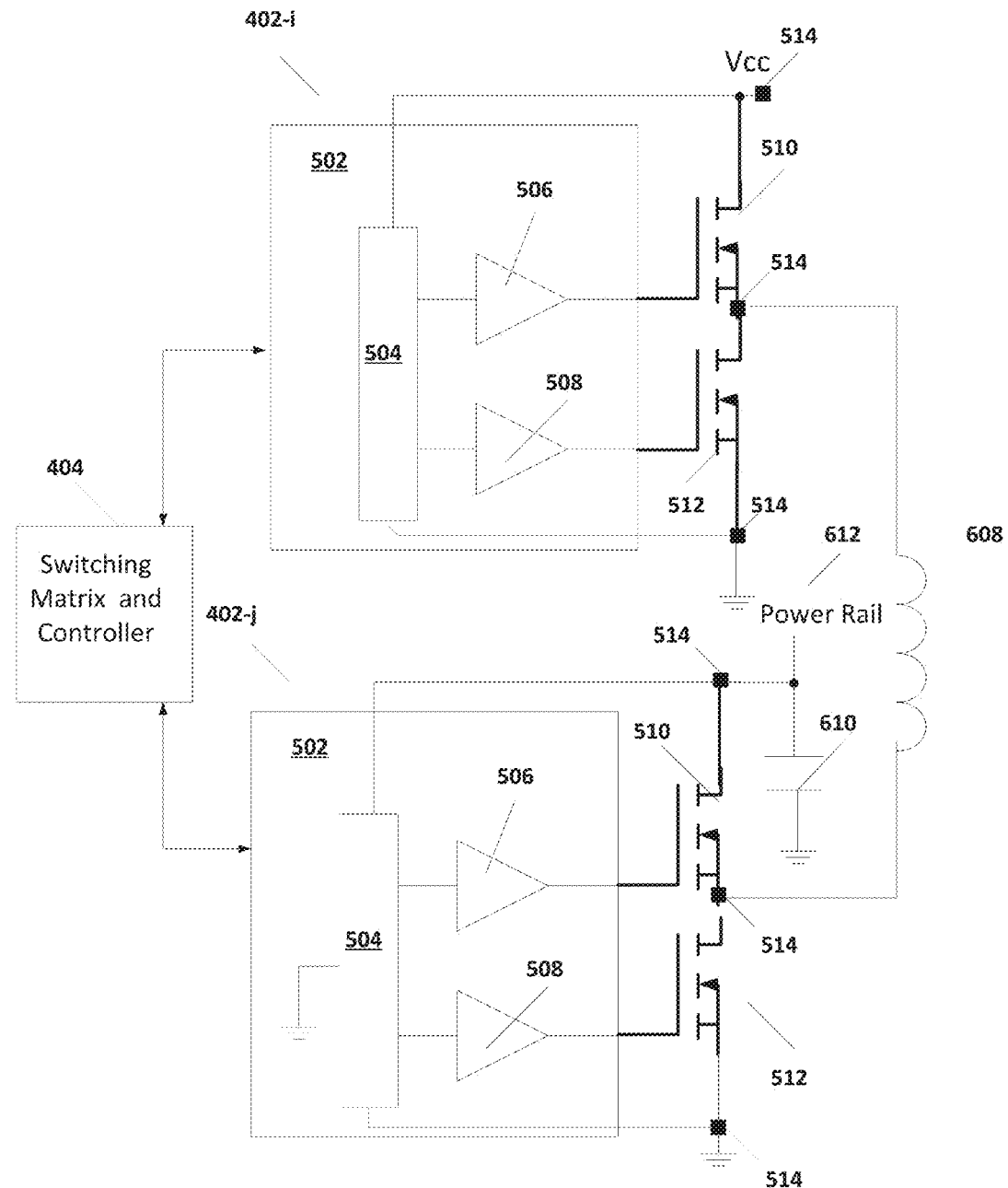

FIG. 6D illustrates use of cell 402-i and cell 402-j in a buck-boost arrangement. As shown in FIG. 6D, an inductor 608 is coupled between the outputs of cells 402-i and 402-j. As is further shown, FET 510 of cell 402-j is coupled through capacitor 610 to ground. Power at FET 510 is provided at power rail 612. Again, switching matrix and controller 404 is coupled to both CELL 402-i and CELL 402-j to appropriately control the power provided at power rail 612.

Figure 6E:
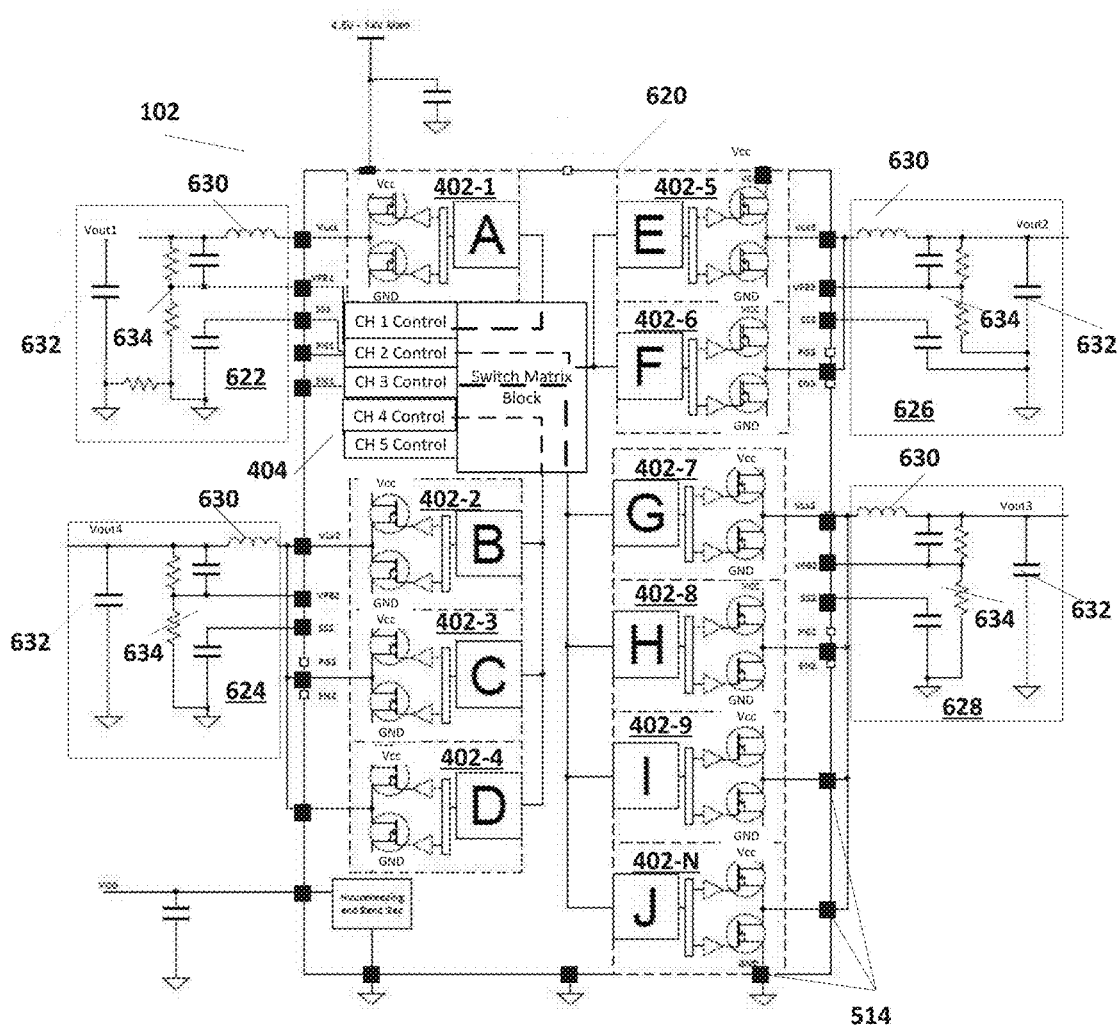

FIG. 6E illustrates PMIC 102 programmed to drive four buck converters, parts of which are mounted on PCB 104 external to the chip PMIC 102, to provide four output voltages. As shown in FIG. 6E, PMIC 102 is formed on a single integrated circuit chip 620 that includes cells 402-1 through 402-N, where in this particular example N is 10. Chip 620 includes multiple input/output pins 514 through which connections are made to components external to chip 610.

Switching matrix and controller 404 is programmed to accommodate four channels, each of which produces one output voltage. Channel 1 controls cell 402-1, which drives circuit 622 as a buck converter to produce voltage Vout1. Channel 2 controls cells 402-5 and 402-6, which are coupled to drive circuit 626 as a buck converter to produce voltage Vout2. Channel 3 controls cells 402-7, 402-8, 402-9 and 402-10, which are coupled to drive circuit 628 as a buck converter to produce voltage Vout3. Channel 4 controls cells 402-2, 402-3, and 402-4, which are coupled to drive circuit 624 as a buck converter to produce voltage Vout4. As shown in FIG. 6E, circuits 622, 624, 626, and 628, which are formed on PCB 104 surrounding PMIC 102, each include a series combination of inductor 630 and capacitor 632 that receives power from one or more of cells 402-1 through 402-N and provides the output power. Further, each of circuits 622, 624, 626, and 628 includes monitoring circuits 634 that provides signals back to switching matrix and controller 404. Such signals are used to regulate and control the power output of each of circuits 622, 624, 626, and 628.

As is shown in FIG. 6E, there may be additional controllers in switching matrix and controller 404. In particular, in the example illustrated in FIG. 6E switching matrix and controller 404 includes a fifth controller in order to control the four channels illustrated. Based on telemetry data, external logic signals, or interface commands, switch matrix and controller 404 can be configured to change the mapping of cells 402 to controllers. This can include adding or dropping a cell 402 to a given controller or shifting all of the cells 402 from a given controller to another controller which might be configured with a different control loop topology. For example, a controller executing a light-load control method may be used in light-load conditions to improve efficiency.

Figure 6F:
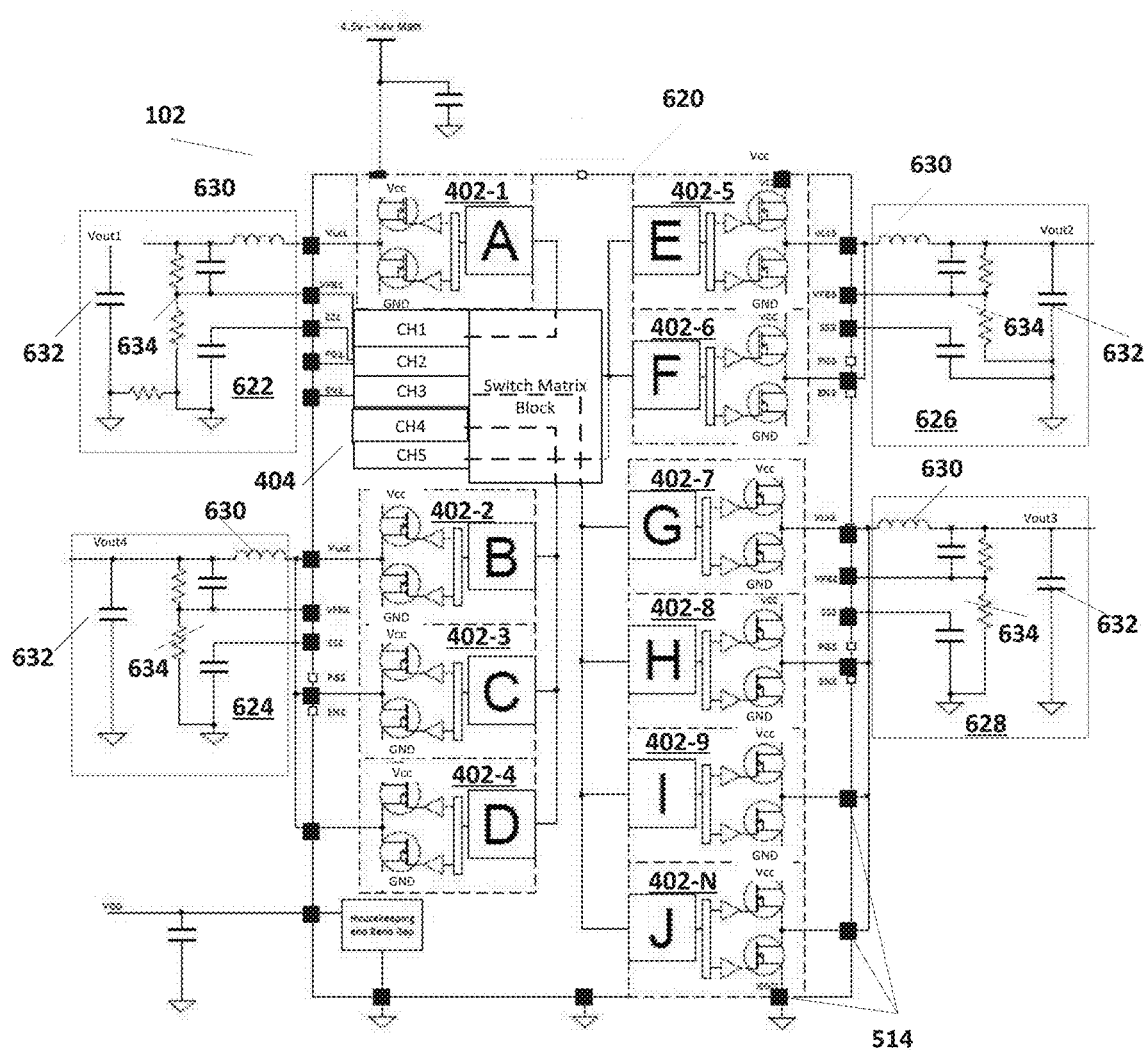
Figure 6G:
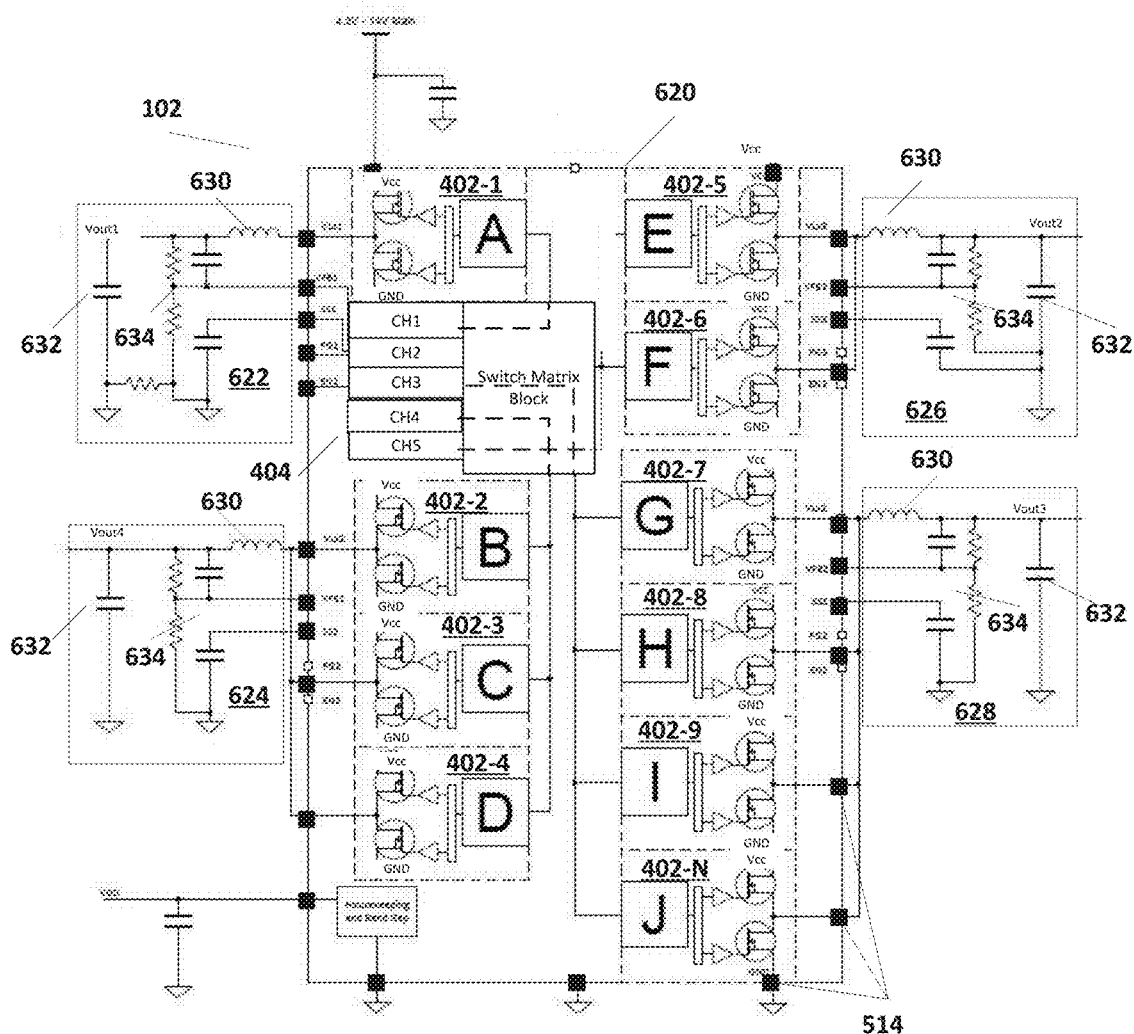

FIG. 6F illustrates switching the controller driving the channel with cells 402-5 and 402-6, controller 2, with a different controller, controller 5. FIG. 6G also illustrates dynamically switching out cell 402-5 from the channel controlled by controller 5.

In general, PMIC chip 620 can accommodate any number of individual cells 402. Additionally, in any particular configuration, multiple PMIC chips 620 can be utilized and cells 402 from the multiple chips 620 can be combined to provide the required power for device 106.

Figure 6H:
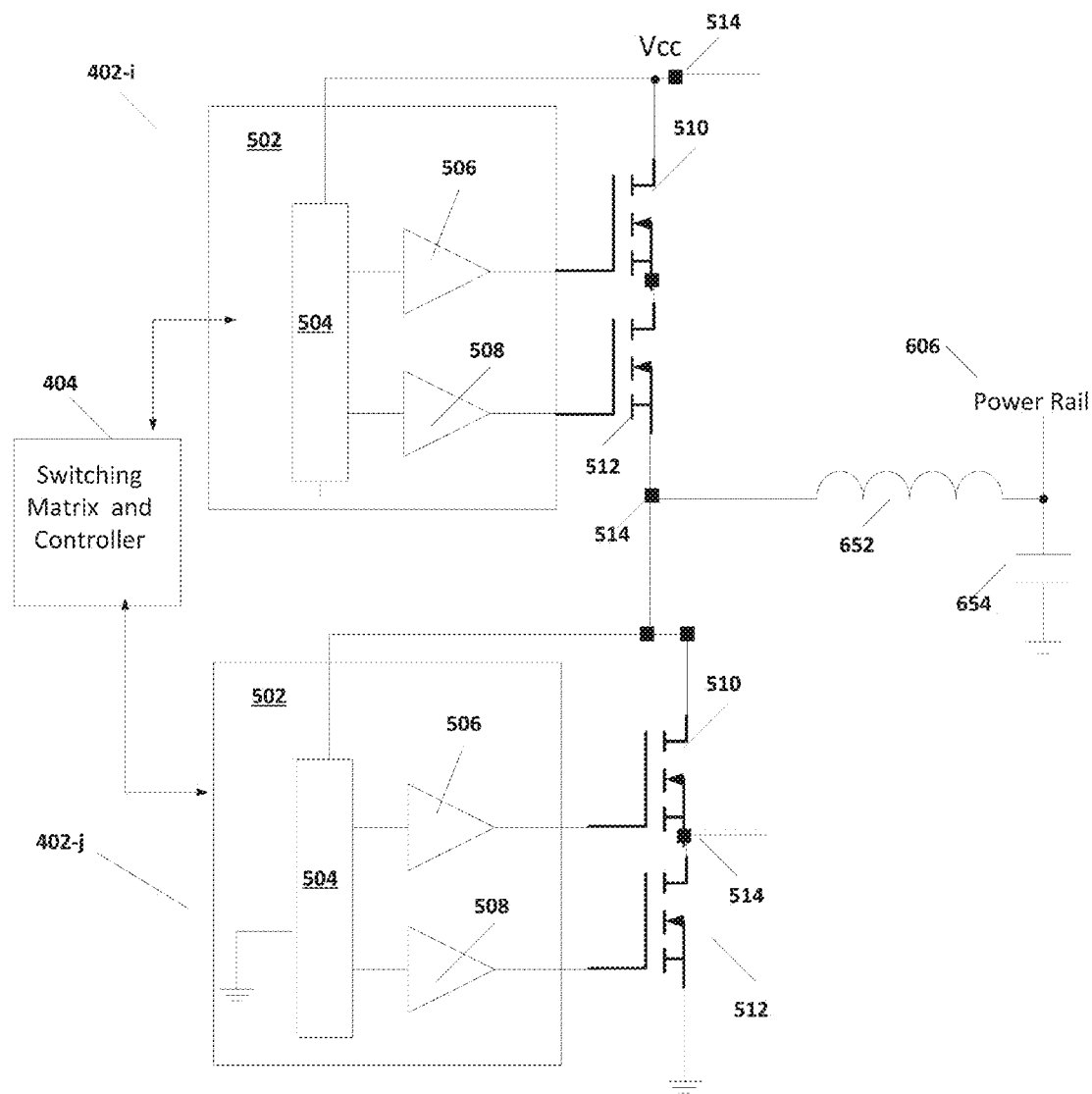

FIG. 6H illustrates cells 502 arranged in a cascode fashion. Although only two cells 502 are illustrated in FIG. 6H, any number of cells 502 can be provided in a cascode arrangement. A cascode arrangement allows for high input voltages Vcc and may provide high voltage power rails as well. As shown in FIG. 6H, a first cell 402-*i* receives power Vcc The gates of transistors 510 and 512 of cell 402-*i* are driven together so that both transistors 510 and 512 are on or off simultaneously. In some embodiments, one of transistors 510 and 512 of cell 402-I can remain on while the other is switched. The drain of transistor 512 of cell 402-*i* is coupled to the source of transistor 510 of cell 402-*j*. Cell 402-*j* is driven as described above for cell 402-*i*. Together, cells 402-*i* and 402-*j* are coupled to power components 652 and 654 in order to drive power rail 606.

Each of FIGS. 6A, 6B, 6C, 6E, 6F, and 6G illustrate use of combinations of cells 402 to drive a buck power converter circuit. FIG. 6D illustrates use of combinations of cells 402 to drive a buck-boost power converter circuit. In general, combinations of cells can be used to drive any power output circuit, including buck, boost, inverting buck boost, H bridge buck boost, forward, active clamp forward, active diode, flyback, Cuk, single-ended primary-inductor converter (SEPIC), 2 switch flyback, 2 switch forward, half bridge, push-pull, full bridge, phase shifted bridge, and/or other types of conversion required to provide power to device 106. In programming PMIC 102 accordingly, both switching matrix and controller 404, cells 402, and components of power conversion circuits are appropriately configured to meet the power requirements of device 106. Referring back to FIG. 2, software operating on data processing system 108 operates to both program PMIC 102 in order to control multiple cells 402 as illustrated in FIGS. 6A, 6B, 6C, 6D, 6E, 6F, and 6G to provide configuration of PCB 104 and individual electronic components that are coupled to PMIC 102 to provide the appropriate power outputs to individual rails. Individual electronic components coupled to PMIC 102 can include, for example, inductors, capacitors, resistors, transistors.

Figure 7A:
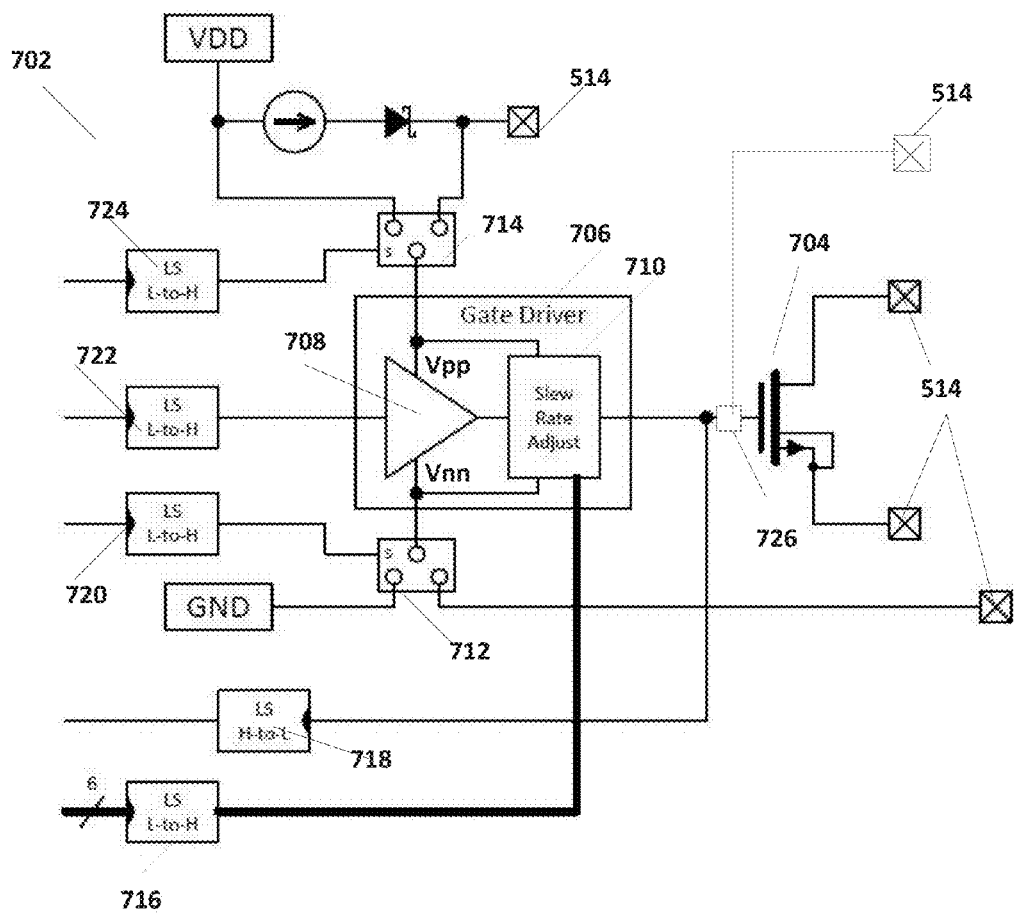
FIGS. 7A and 7C illustrates an element according to some embodiments.
Figure 7B:
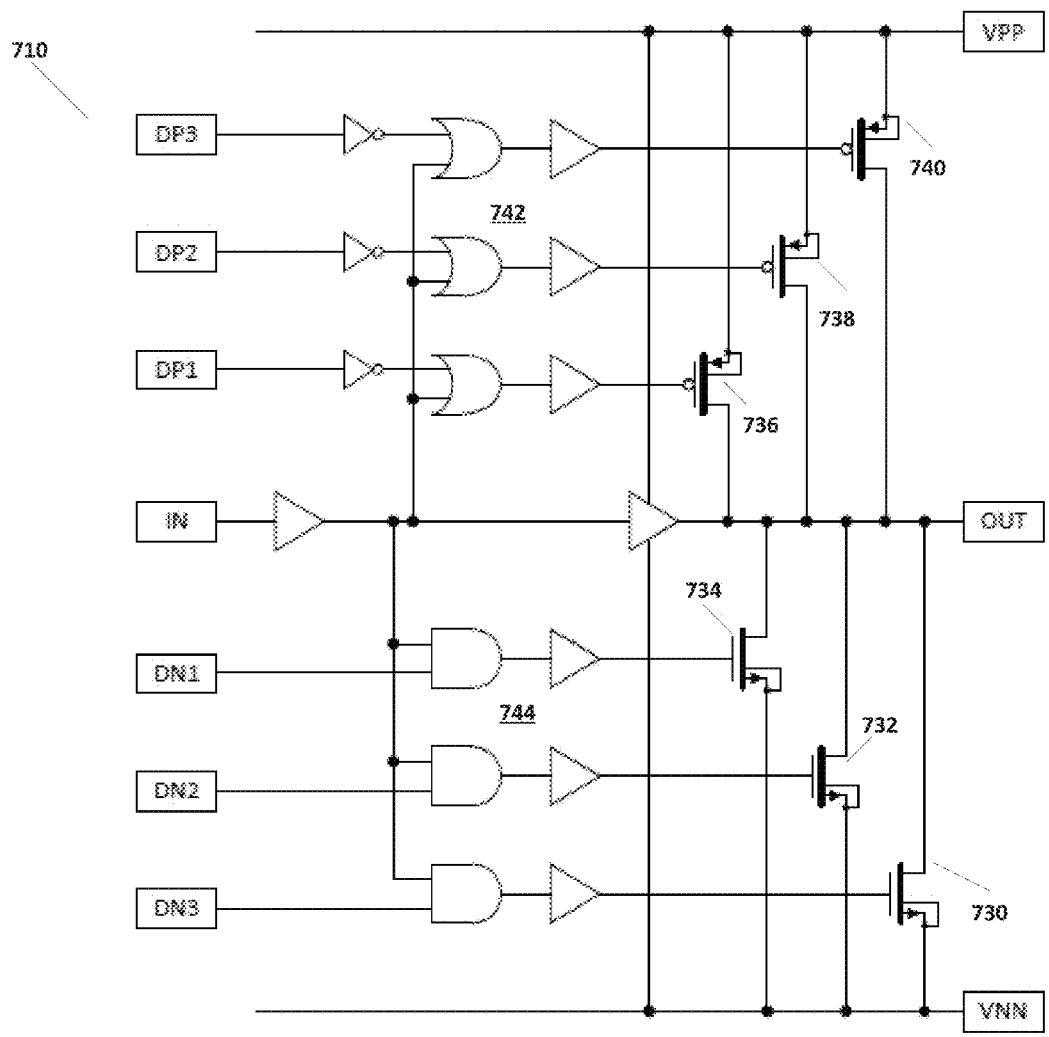
FIG. 7B illustrates an example of a slew-rate control circuit within an element as illustrated in FIGS. 7A and 7C.
Figure 7C:
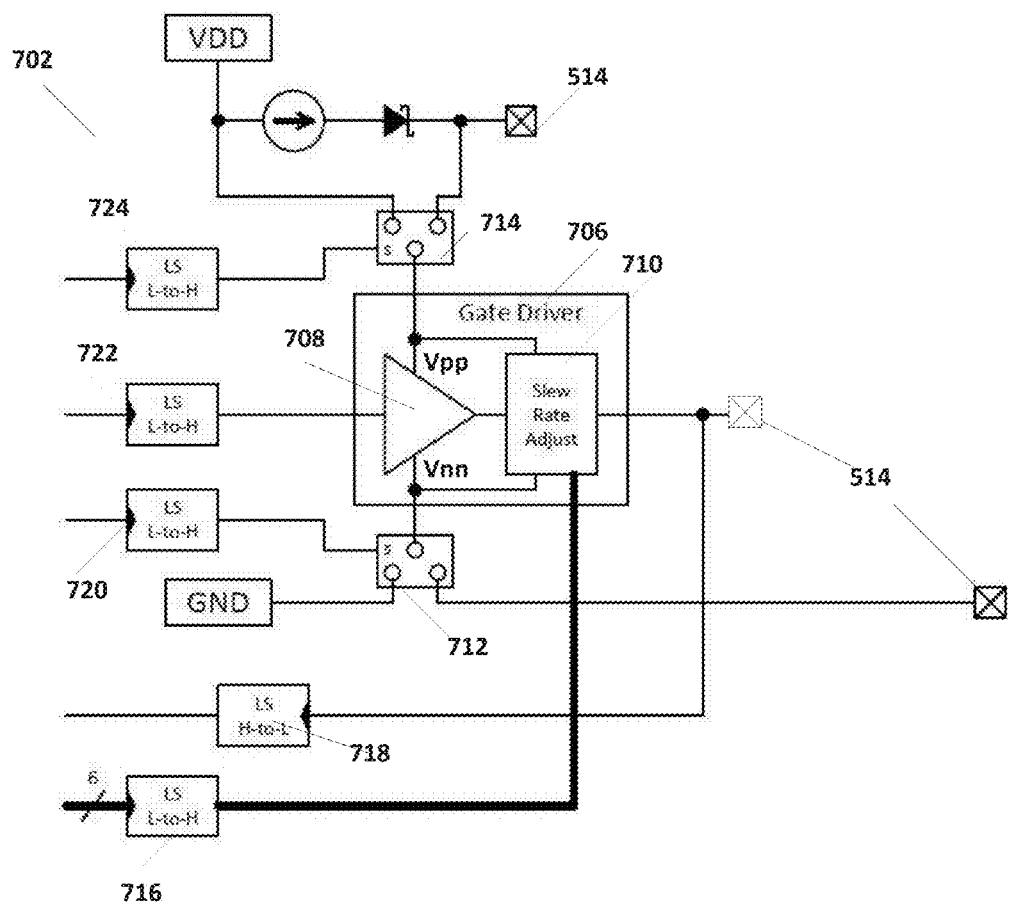
Figure 7D:
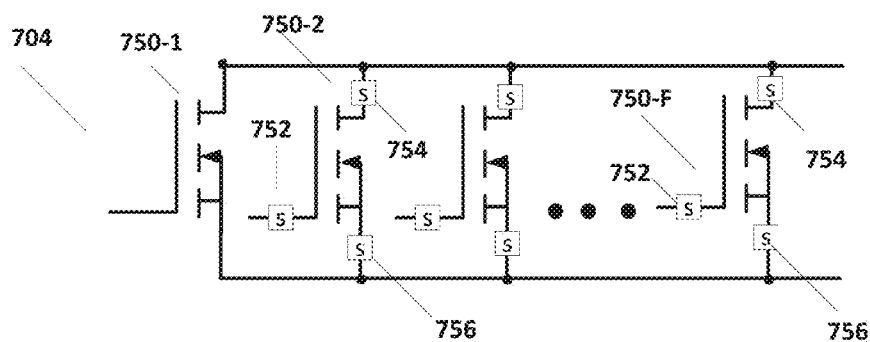
FIG. 7D illustrates FET transistor arrangement that can be used in the element as illustrated in FIG. 7A.
Figure 7E:
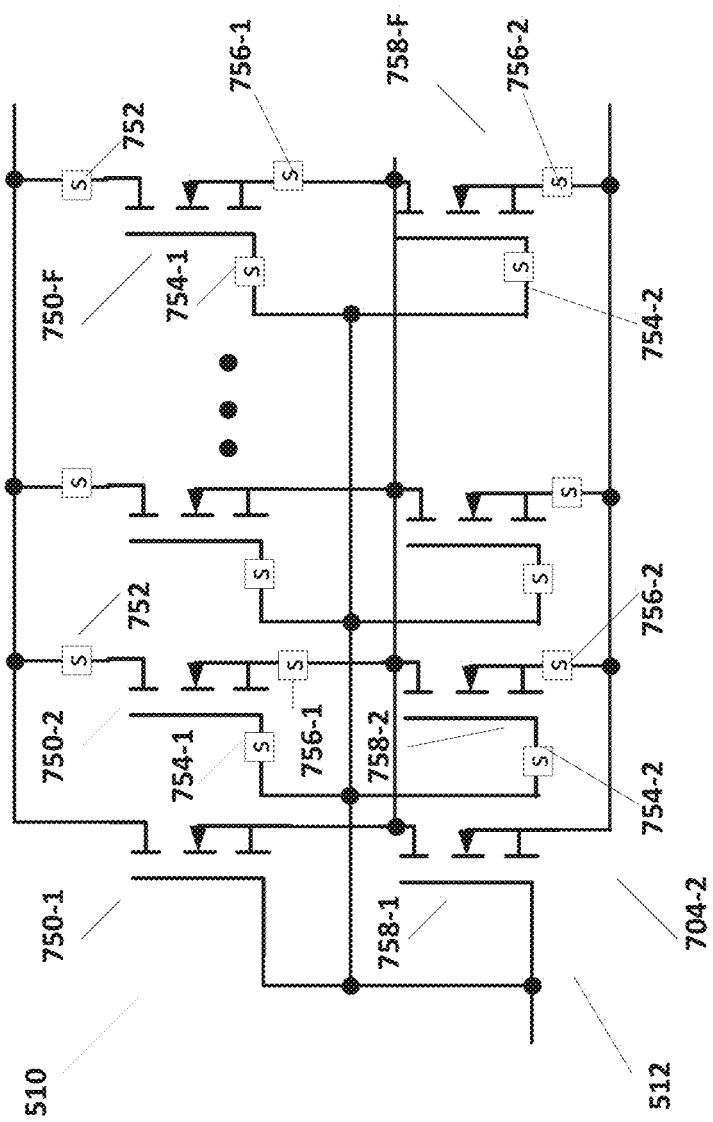
FIG. 7E illustrates an FET arrangement in a cell using the FET arrangement illustrated in FIG. 7D.
Figure 7F:
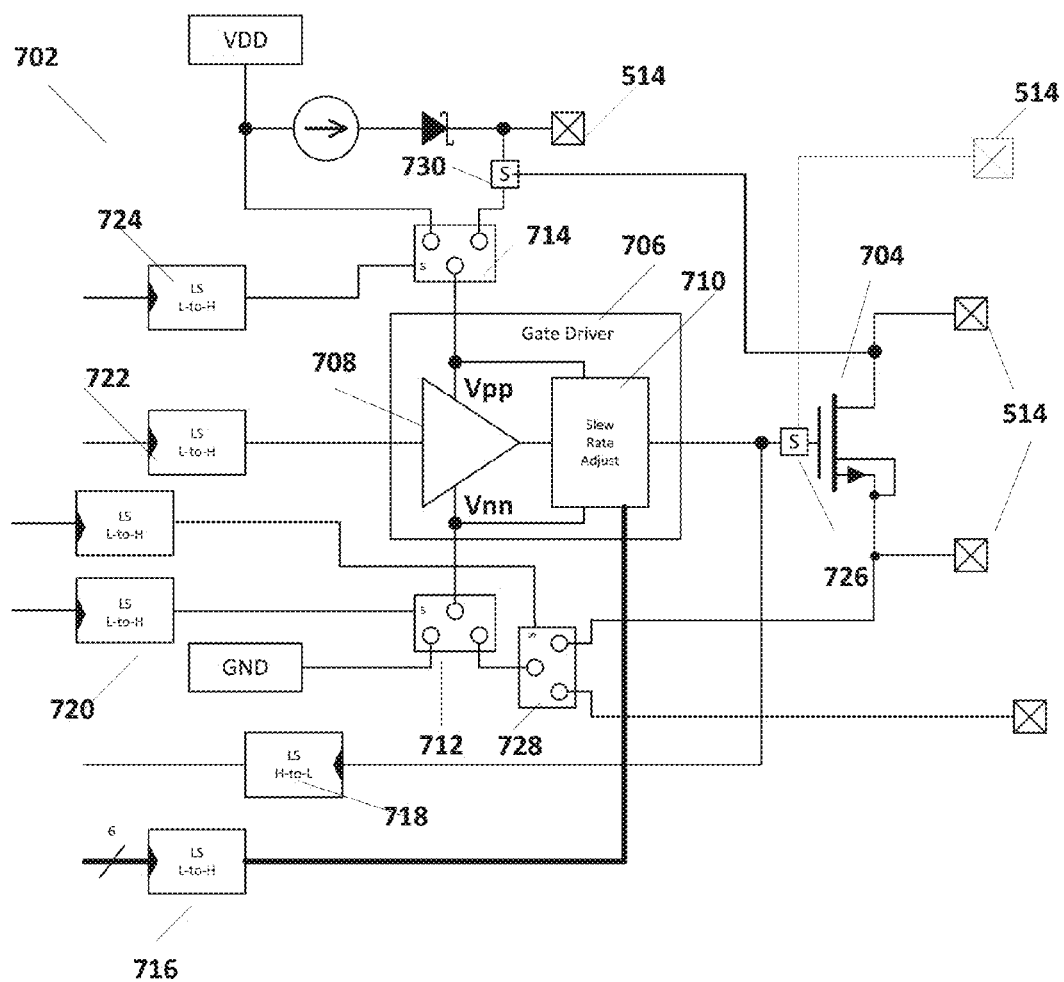
FIG. 7F illustrates an arrangement of programmable switching in an element as illustrated in FIG. 7A.

Cell 402 as illustrated in FIG. 5 can be formed of a combination of elements 702, also referred to as Universal FET Elements (UFEs), as illustrated in FIG. 7A, 7C, or 7F. Each cell 402 can be formed from one or more elements 702. An example of elements 702 illustrated in FIG. 7A includes a transistor 704 and a gate drive 706 coupled to drive the gate of transistor 704. The source and drain of transistor 704 can both be coupled to I/O pins 514 or in some embodiments may be coupled internally to other elements 702, other components, power, or ground. As is illustrated in FIG. 7A, the source and drain of Transistor 704 are coupled to I/O pins 514 in order to combine elements 702 to form cells 402.

In some embodiments, a programmable switching element 726 can be included between gate driver 706 and the gate of transistor 704, as is illustrated in FIG. 7A and FIG. 7G. Programmable switching element 726 can operate to direct the gate drive signal from gate driver 706 directly to an I/O pin 514 in order to drive a transistor external to PMIC 102. In that case, transistor 704 may be programmed out of element 702.

Gate driver 706 can include a slew rate adjust circuit 710 and an amplifier 708. As is further shown in FIG. 7A, the power inputs to amplifier 708 are coupled to switches such that Vpp is coupled to switch 714 and Vnn is coupled to switch 712. Switch 722 couples Vnn either to ground or to an input at an input pin 514 in response to a level shifter input 720 Similarly, switch 714 couples Vpp to either input power Vdd or to an input at another input pin 514 in response to a level shifter input 724. The input signal to amplifier 708 can be level shifted by level shifter 722. Furthermore, the gate of transistor 704 can be coupled to a level shifter 718 to provide a feedback signal FB from element 702. Input signals to slew rate adjust 710 are input through level shifter 716. Level shifters 724, 722, 720, 718 and 716 are programmable at the time of configuration of PMIC 102 or while PMIC 102 is in operation.

FIG. 7B illustrates an example of slew rate adjust circuit 710. As shown in the particular example of FIG. 7B, configurable input signals DP1, DP2, DP3, DN1, DN2, and DN3 can affect or control the transition of the output signal from slew rate adjust circuit 710. A comparison of the input signal with DP1, DP2, and DP3 in logic circuit 742 determines how many of p-channel transistors 736, 738, and 740 are turned on. Similarly, a comparison of the input signal with DN1, DN2, and DN3 in logic circuit 744 determines how many of n-channel transistors 734, 732, and 730 are turned on. A combination of turning on transistors 730, 732, 734, 736, 378, and 740 with controlling the power rails Vpp and Vnn determine the slew rate at which the output signal can transition between on and off states of transistor 704. In some embodiments, the slew rate going positive can differ from the slew rate going negative.

FIG. 7C illustrates an example of element 702 that does not include transistor 704. Instead, the example of element 702 illustrated in FIG. 7C provides for driving an external transistor. In some embodiments, element 702 illustrated in FIG. 7A can include a configurable switch (not shown) that can be programmably configured to output the signal from the gate of transistor 704 so that transistor 704 can be configured out of element 702, as is illustrated in FIG. 7A. In other arrangements, element 702 can be formed of a driver, which may or may not include a slew rate adjust circuit, to a transistor 704. Such an element 702 should be combined with a element 702 such as that shown in FIG. 7A or 7C in order to provide a configurable cell 402. Other examples and variations of element 702 that may be suitable will be apparent to one skilled in the art.

FIG. 7D illustrates a combination of transistors that can be programmed to form FET 704. As shown in FIG. 7D, FET 704 can be formed from an integer number F of parallel coupled FETs 750-1 through 750-F. Transistors 750-1 through 750-F may be substantially identical in size, or there may be multiple sizes of transistors to choose from. Each of FETs 750-2 through 750-F include one or more of program elements 752, 754, and 756. Program element 752 determines whether the gate of its respective FET 750 is coupled to the gate of FET 750-1 and program elements 754 and 756 determine whether the gates and drains of respective ones of FETs 750-2 through 750-F are connected. In this fashion, the number of FETs 750 that form FET 704 can be programmed, allowing for variation of the effective size of FET 704.

FIG. 7E illustrates the arrangements of transistors 704 as illustrated in FIG. 7D to form a cascode arrangement as illustrated in FIG. 6H. As illustrated in FIG. 7E, transistor 510 includes transistors 750-1 through 750-F while transistor 512 includes transistors 758-1 through 758-F. Transistors are switched with switches 752, 754-1, 756-1, 754-2, and 756-2 in order to form the transistors 510 and 512 illustrated in FIG. 6H.

FIG. 7F illustrates an element 702 with programmable switches 728 and 730 that provide signals to an input of switches 712 and 714, respectively. Switch 730 is programmed to switch between an I/O pin 514 and the source of transistor 704. Switch 728 is programmed to switch between an I/O pin 514 and the drain of transistor 704.

Figure 8A:
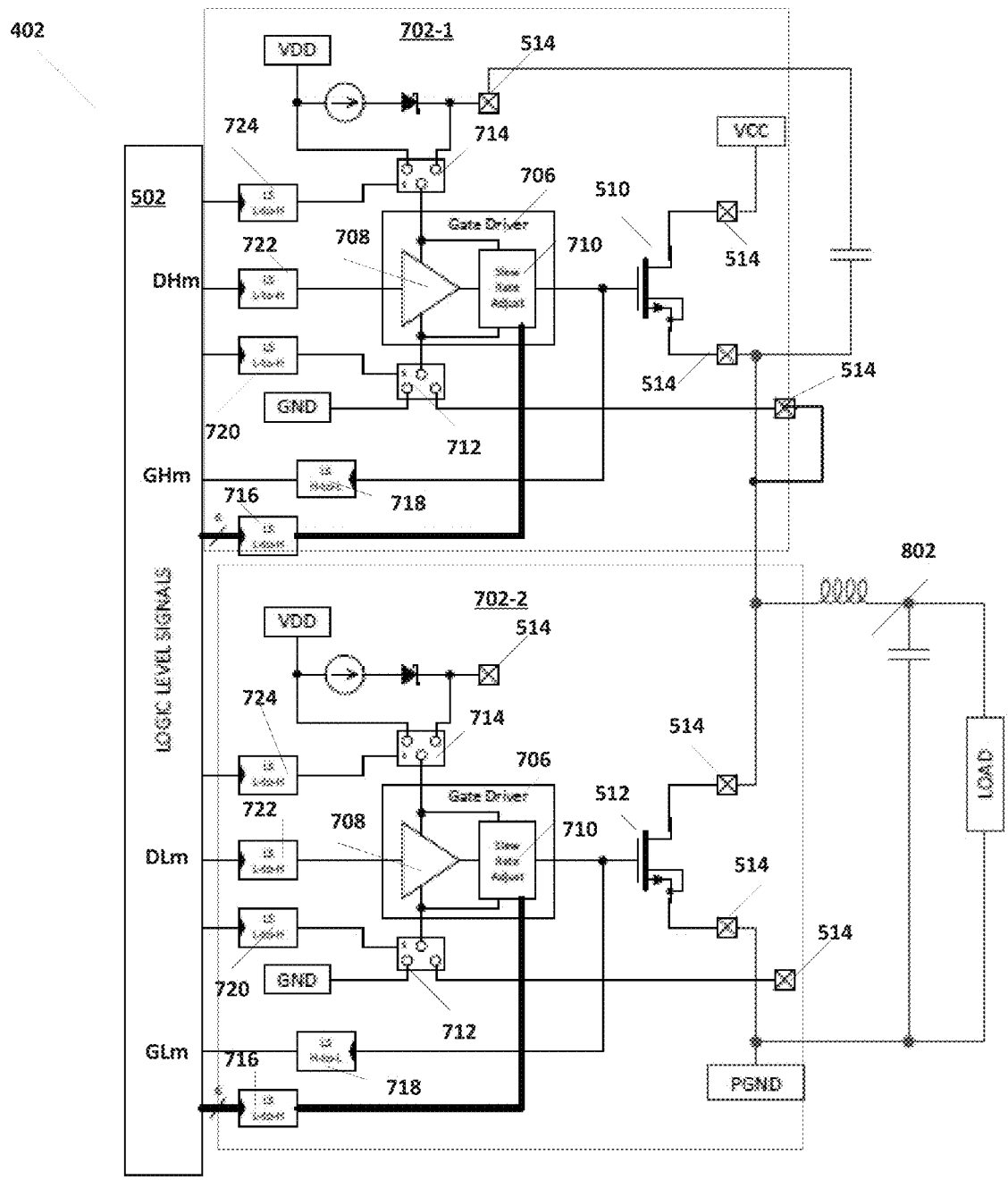
FIGS. 8A through 8C illustrate combinations of elements to form a cell as illustrated in FIG. 5.

As shown in FIG. 8A, multiple elements 702 can be combined to form a cell 402. FIG. 8A illustrates a cell 402 that is formed by combining two of elements 702 as illustrated in FIG. 7A. As shown, placement of elements 702 in cell 402 determines whether transistor 704 is configured as transistor 510 or transistor 512. Again, further control lines may provide that transistors 510 and 512 are capable of becoming transistors with asymmetric size and resistance per unit area by switching in or out multiple transistors.

As is illustrated in FIG. 8A, logic block 502 provides input signals to level shifters 722, 724, 720, 718, and 716 along with switches 712 and 714 for both element 702-1 and 702-2 in order to control transistors 510 and 512. For purposes of illustration, FIG. 8A illustrates connection of elements 702-1 and 702-2 in a buck configuration. As shown in FIG. 8A, power Vcc is applied to through an I/O pin 514 that is coupled to the high end of transistor 510. The low end of transistor 510 is coupled to another pin 514 and to the top end of transistor 512. The low end of transistor 512 is coupled to ground. Buck circuit 802 is coupled between the top end of transistor 512 and ground while a load is supplied across buck circuit 802. An input to switch 712 in element 702-1 in the example illustrated in FIG. 8A is coupled to the drain of transistor 510. The input to switch 714 in element 702-1 is coupled to the low end of transistor 510 through a capacitor. As described above, switches 714 and 712 are configurable to set the power inputs to gate driver 706 to either Vdd and the input to switch 714 in switch 714 and to either ground and the input to switch 712 in switch 712. Inputs to switches 712 and 714 in element 702-2 are not shown as connected in this configuration, although they may be coupled to other power supply inputs.

Figure 8B:
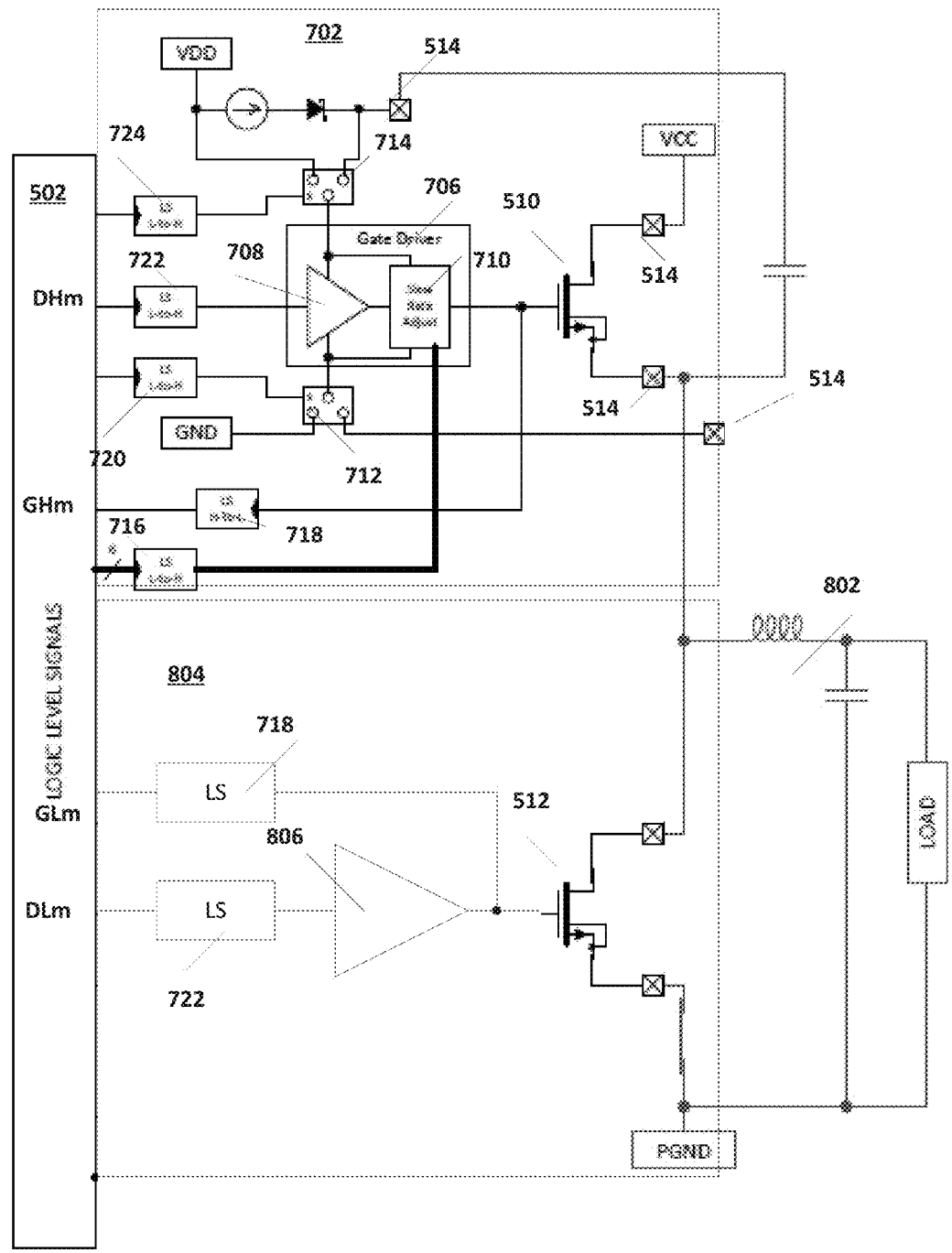

FIG. 8B illustrates an example where element 702-2 is replaced with element 804. Element 804 includes a driver 806 that drives the gate of transistor 512 according to signals received from logic circuit 502. Driver 806 can be similar to driver 706 described above. Element 804, in some embodiments, can be configured such that transistor 512 is replaced with a diode. Further, the input to switch 712 is coupled to an I/O pin 514.

Figure 8C:
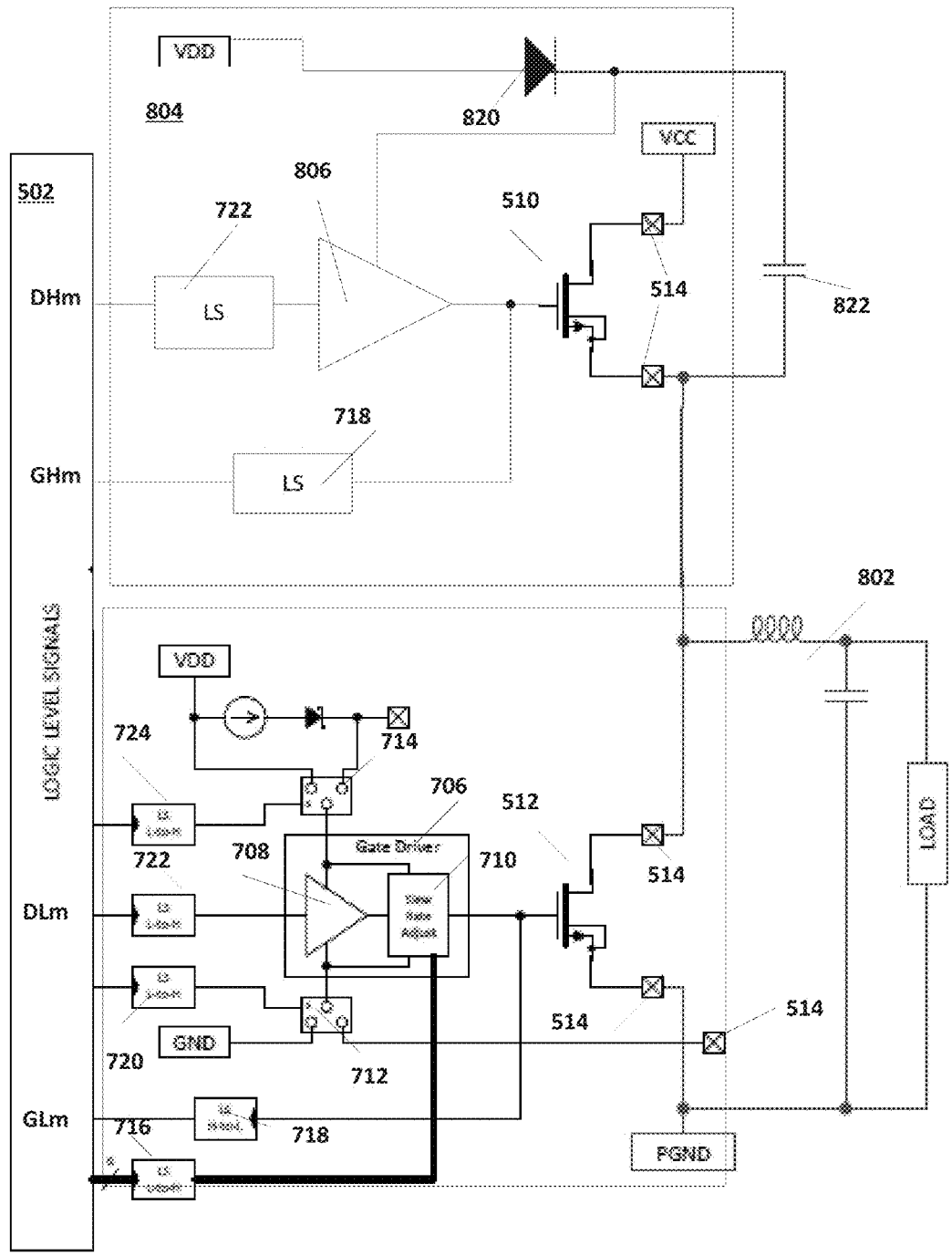

FIG. 8C illustrates an example where element 702-1 is replaced with element 804. Although FIG. 8C shows inputs to switches 712 and 714 as not connected, connections or input signals can be supplied to those switches in some embodiments. Furthermore, a diode 820 and capacitor 822 are coupled between VDD and the drain of transistor 510.

Referring to the embodiment illustrated in FIG. 6E, switch matrix and controller 404 is configured into channels (four channels are illustrated in FIG. 6E), where each channel is configured to drive a certain number of cells 402. For example, in FIG. 6E, channel 1 is configured to drive cell 402-1 while channel 3 is configured to drive cells 402-7, 402-8, 402-9 and 402-10. PMIC 102 can be configured to have any number of channels that each drive any number of cells.

Figure 9A:
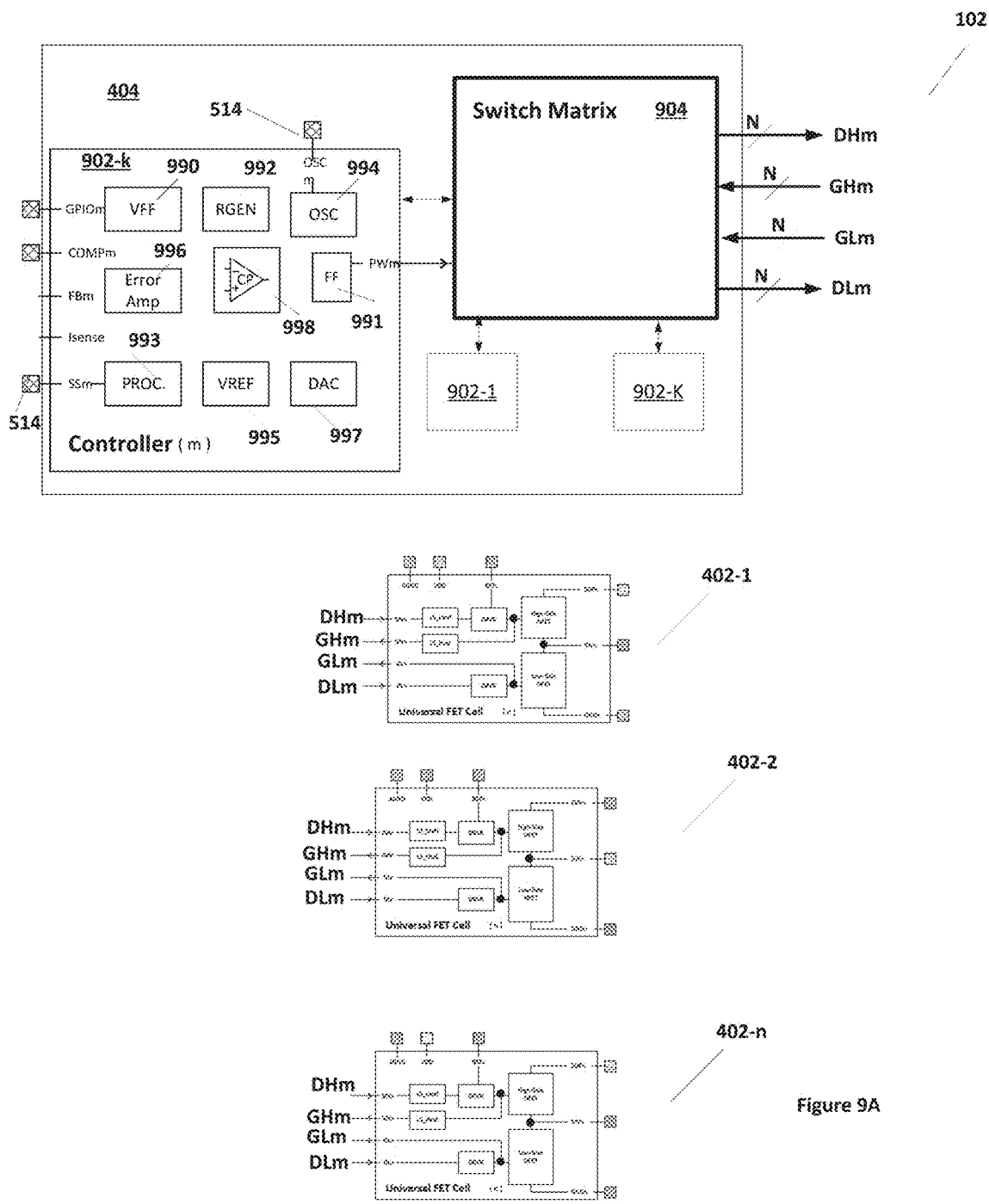
FIG. 9A illustrates control of a channel including multiple cells according to some embodiments.

FIG. 9A illustrates an example channel of PMIC 102, labeled channel m. As shown, switch matrix and controller 404 drives a number n of individual cells 402-1 through 402-$n$. cells 402-1 through 402-$n$ is a subset of the N cells 402 available on PMIC 102. Other channels drive different subsets of cells 402-1 through 402-N. As is illustrated in FIG. 9A, for each channel established in the configuration switch matrix and controller 404 includes a controller 902-$k$ and a switch matrix 904. Controller 902-$k$ provides signals to switch matrix 904, including a pulse-width modulation signal for that channel. As shown in FIG. 9A, controller 902-$k$ is the one of controllers 902-1 through 902-K, where K is the number of controllers included on PMIC 102, assigned to channel m.

As shown in FIG. 9A, controller 902-$k$, the one of controllers 902-1 through 902-K that is selected for channel m, receives multiple inputs and provides multiple outputs, some of which are coupled to I/O pins 514 of PMIC 102. Such inputs and outputs include an I/O channel, voltage compensation levels COMPm, feed-back FBm, current sense thresholds Isense, and soft start signal SSm, over current protection (OCP), thermal sensing (THM), among other signals. As is further illustrated in FIG. 9A, controller 902-$k$ can include multiple functional blocks, including voltage feed forward (VFF) blocks 990, ramp generator (RGEN) blocks 992, oscillator (OSC) blocks 994, error amplifiers 996, comparators 998, flip-flops 991, a processing block 993, voltage reference generators (VREF) 995, and digital-to-analog converters (DAC) 997. Controllers 902 can include one or more processors 993 that provide many of the functions illustrated, although controllers 902 may be implemented without a processor. In some embodiments, controllers 902-1 through 902-K share a single processor, although controllers 902-1 through 902-K may each have a processor or there may be a combination of some controllers with processors and some without.

Processor 993 can also execute monitoring algorithms that determine load profiles and power response monitoring as described above. Further, processor 993 can communicate with an external processor that monitors some or all of the response of the power train. Processor 993 can therefore determine load profiles of target device 106 and can adjust the operation of PMIC 102 accordingly.

Controllers 902-1 through 902-K can be configured with any number of topologies appropriate for the conditions in which it operates. Each one of controllers 902, for example, may be optimized for particular load conditions. In some embodiments, controller 902-$k$ may be dynamically exchanged with a different one of controllers 902-1 through 902-K that is optimized for other purposes when conditions are detected that favor that optimization. As discussed above, in some embodiments, controller 902-$k$ can be dynamically switched with another of controllers 902-1 through 902-K in order to increase efficiencies of operation under certain operating conditions. In some embodiments, once a controller 902-$k$ has been programmed to channel m, switching to another controller 902 may require reprogramming of PMIC 102.

Switch matrix 904 receives signals from controller 902 and provides signals to cells 402-1 through 402-$n$. As illustrated in the example of FIG. 9A, switch matrix 904 provides driver signals DHm and DLm to each of cells 402-1 through 402-$n$. As illustrated in FIG. 8A, for example, DHm drives the gate of transistor 510, the high side of cell 402, while DLm drives the gate of transistor 512, the low side of cell 402.

Additionally, switch matrix 904 receives gate signals GHm and GLm from each of cells 402-1 through 402-$n$. As is illustrated in FIG. 8A, for example, gate signal GHm originates from the gate of transistor 510, the high side of cell 402, while gate signal GLm originates from the gate of transistor 512, the low side of cell 402.

As is illustrated in FIG. 9A, cells 402-1 through 402-$n$ can be arranged with elements 702 different from that illustrated in FIG. 8A. However, gate drive signals and gate sense signals (DHm, DLm, GHm and GLm) are similar in each embodiment of cell 402, as is illustrated in the examples of FIGS. 8B and 8C.

Figure 9B:
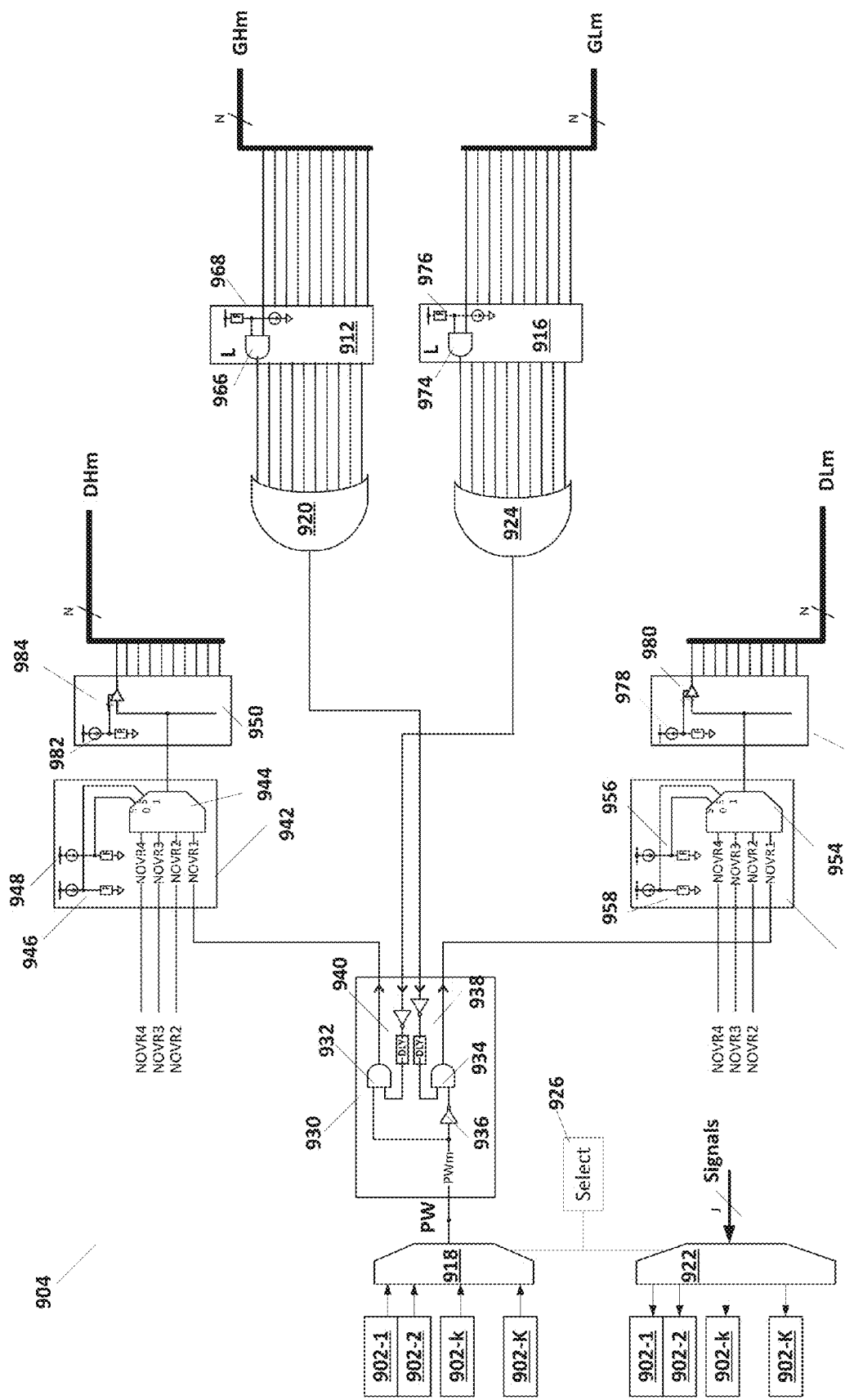
FIG. 9B illustrates a switch matrix for the channel of PMIC illustrated in FIG. 9A.

FIG. 9B illustrates an embodiment of switch matrix 904. Programmable block 912 receives GHm signals on lines from each of cells 402 and operates such that de-selected input signals result in a low output signal. The output signal from block 912 is input to OR gate 920, which produces a high signal if any one of the selected input signals GHm are high. As is illustrated in FIG. 9B, in programmable block 912, each signal line carrying GHm from each cell 402 is coupled to an AND gate 966, which also receives a signal from programmable element 968. If programmable element 968 provides a low signal, then the output signal from AND gate 966 will always be low, thereby deselecting the corresponding input line. If the input to AND gate 966 from programmable element 968 is high, then AND gate 966 outputs a signal corresponding to the signal on the corresponding input line. Programmable element 968 can be a fused element or may be a bit from a register or memory location located elsewhere in PMIC 102. In a fused element as shown in FIG. 9B, if the fuse is blown then the corresponding input line is deselected.

Programmable block 916 receives the GLm signals from each of the lower transistors (transistor 512) of cells 402. Programmable block 916 operates in the same fashion as programmable block 912 discussed above and includes AND gates 974 and programmable element 976. As discussed above, AND gate 974 will output a low signal if the corresponding GLm line is deselected and will follow the corresponding GLm signal if the corresponding line is selected. The output signals from programmable block 916 is input to OR gate 924, which then outputs a high signal if any one of the selected GLm signals is high and a low signal otherwise.

The output signals from OR gates 920 and 924 are input to non-overlap block 930. Non-overlap block 930 receives a pulse wave signal from controller 902. Pulse wave signal is input to AND gate 932 and inverted by inverter 936 and input to AND gate 934. The output signal from OR gate 924 is inverted and delayed in block 940 and input to AND gate 932. The output signal from OR gate 920 is inverted and delayed in block 938 and input to AND gate 934.

Non-overlap block 930 operates such that switching of gate voltage states occurs at a time when no overlap of signals is obtained. The output signal from AND gate 932 is asserted when PWm is asserted and the delayed inverted signals from OR gate 924 is not asserted. Similarly, the output signal from AND gate 934 is asserted when PWm is de-asserted and the delayed inverted signal from OR gate 924 is asserted.

The output signal from non-overlap block 930 is input to programmable multiplexer block 942. Programmable multiplexer block 942 includes a multiplexer 944 and programmable elements, of which programmable elements 946 and 948 are illustrated. Multiplexer 944 chooses a signal from all of the channel signals in accordance with the programmed selection from the programmable elements for output. As shown in FIG. 9B, channel m as indicated is one of the signals input to multiplexer 944. The output signal from multiplexer block 942 is input to programmable block 950 for output as signal DHm to the gates of all of the cells 402 that are selected by programmable block 950. As shown in the present example, programmable block 950 includes a programmable element 982 that provides an enable signal to a buffer 984. Therefore, the signal from AND gate 932 of non-overlap block 930 is provided to the gates of the upper transistor 510 of all of the selected cells.

Similarly, the output signal from AND gate 934 of non-overlap block 930 is input to programmable multiplexer block 952. Programmable multiplexer block 952 includes a multiplexer 954 that selects a signal from one of the channels, including channel m, that is selected by programmable elements 956 and 958. The output signal from multiplexer 954 is input to programmable block 960 and output DLm to the gates of transistor 512 of the selected cells 402. As shown in FIG. 9B, programmable block 960 includes programmable elements 978 that provide enable signals to buffers 980 in order to select or deselect lines.

As is illustrated in FIG. 9B, controllers 902-1 through 902-K may be coupled to a multiplexer 918, which selects a signal from a single controller, for example 902-$k$, to provide a PW signal to non-overlap block 930. Similar, feedback signals such as, for example, over-voltage protection (OVP) and feedback (FB), may be input to a multiplexer 922 for routing to the one of controllers 902-1 through 902-K selected by multiplexer 918. Select block 926 can be a programmable block with programmable elements such as fuses, registers, or nonvolatile memory locations. In some embodiments, select block 926 can dynamically select individual ones of available controllers 902-1 through 902-K depending on operating conditions on channel m.

Although program blocks 912, 916, 950, and 960 are illustrated in FIG. 9B as fixed once programmed, these program blocks may also be dynamically programed, for example by select 926, in order to adjust the number of cells 402 participating in channel m. Further, in relation to multiplexing blocks 942 and 952, other combinations of controllers and non-overlap blocks 930 can be multiplexed to control individual combinations of cells 402.

Figure 10A:
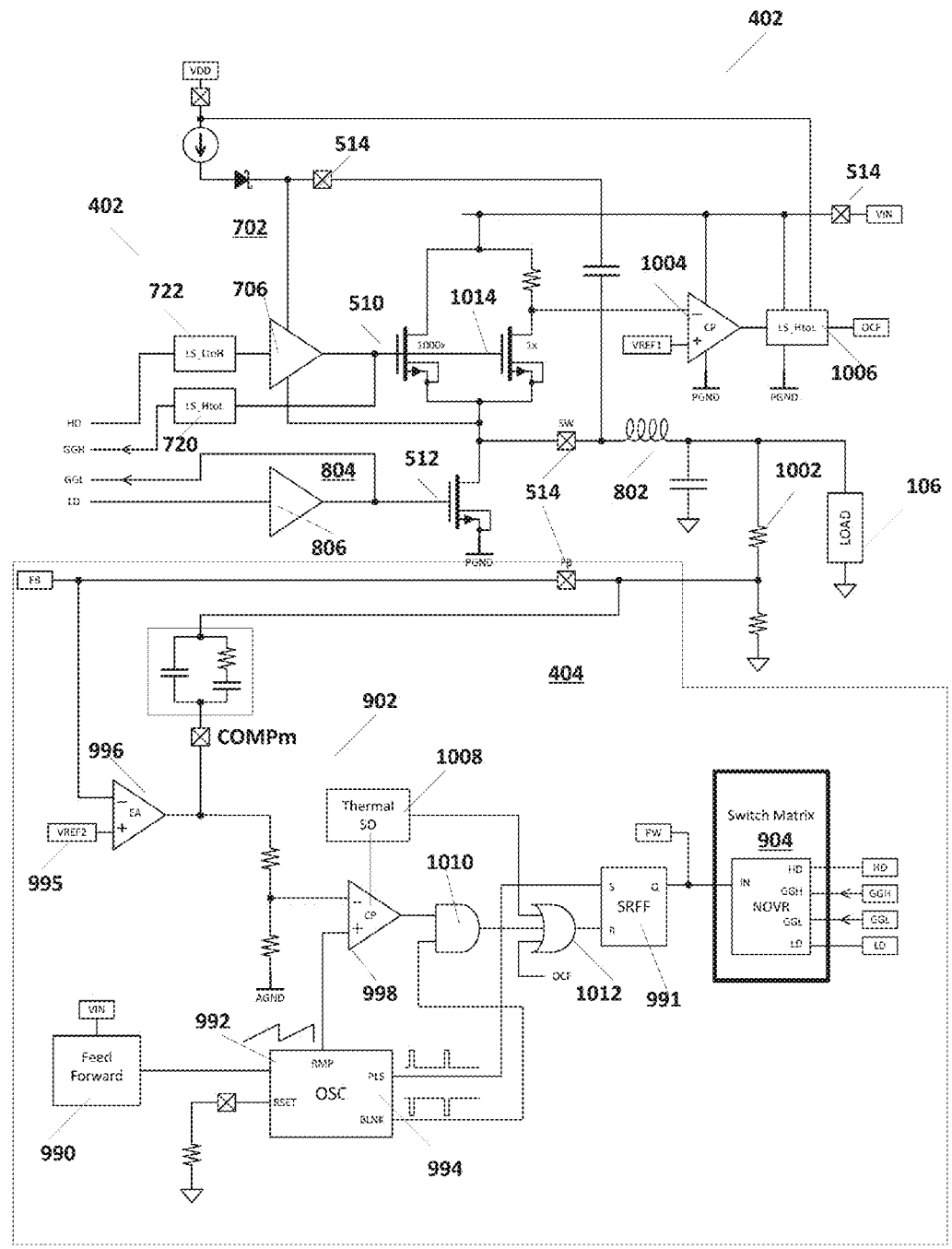
FIGS. 10A and 10B illustrate operation of a cell with a controller and a switch matrix according to some embodiments.

FIG. 10A illustrates an example buck architecture with voltage mode control according to some embodiments. As illustrated in FIG. 10, a cell 402 as illustrated in FIG. 8B drives a buck converter 802. Controller and switching matrix 404 includes a switching matrix 904 that provides signals to cell 402, as discussed above. As is illustrated in FIG. 10, controller 902 provides a pulse width signal to switch matrix 904 and receives several signals from cell 402 that result in a width determination of the pulse width signal provided. As is illustrated, voltage feedback (FB) is provided by a voltage divider circuit 1002. The signal FB is input to error amplifier 996, where it is compared with a reference voltage provided by voltage reference 995. The output signal from error amplifier 996 is coupled into comparator circuit 998. Comparator circuit 998 compares the summed signal with a ramp voltage generator by a ramp generator 992 in oscillator 994. Oscillator 994 receives a signal from feed-forward 990 and produces a pulse wave signal and a ramp signal. A thermal monitor 1008 further provides an input signal to comparator 998. The output signal from comparator 998 is input to AND gate 1010 along with the pulse signal from oscillator 994. The output signal from AND gate 1010 is input to OR gate 1012 along with a signal from thermal block 1008. OR gate 1012 further receives a signal over-current protection (OCP) generated by comparator 1004 through level shifter 1006. Comparator 1004 receives a signal from sensor transistor 1014, which is compared with a reference signal generated by RGEN 995, in comparator 1004. The output signal from OR gate 1012 is input to the reset of flip-flop 991, which generates a pulse width signal with a duty cycle that is determined by the thermal management and the feedback signals OCP and FB.

Figure 10B:
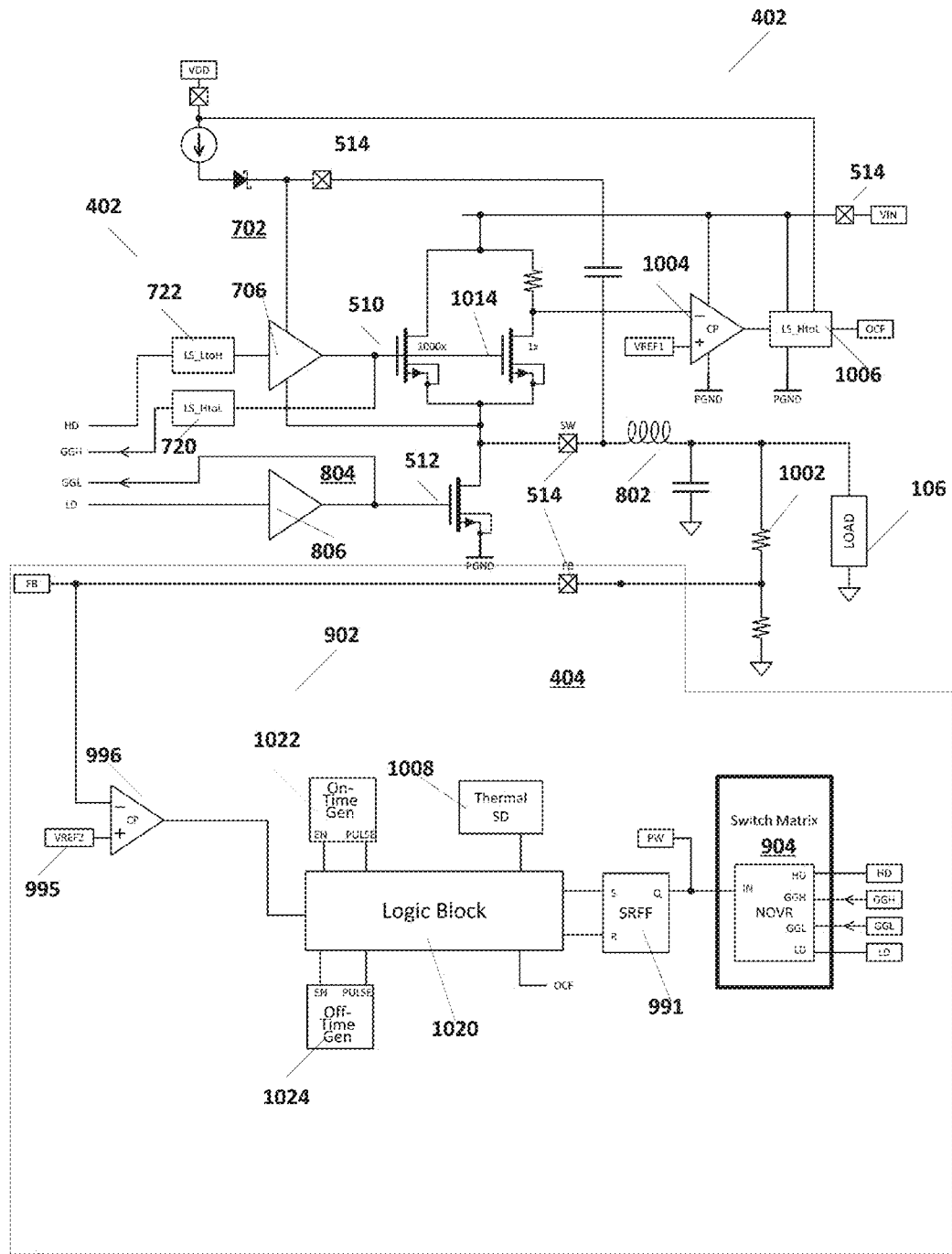

FIG. 10B illustrates another embodiment of a controller 902. As shown in FIG. 10B, the outputs from error amplifier 996 and thermal block 1008 are input to logic block 1020. An on-time generator 1022 and off-time generator 1024 provide pulses to logic block 1020. Logic block 1020 then provides signals to flip-flop 991 in response to the on-time pulse from on-time generator 1022, the off-time pulse from off-time generator 1024, and the signal from error amplifier 996. Consequently, logic block 1020 and flip-flop 991 provide a PW signal to switch matrix 904 between the on-time pulse and the off-time pulse.

Figure 11A:
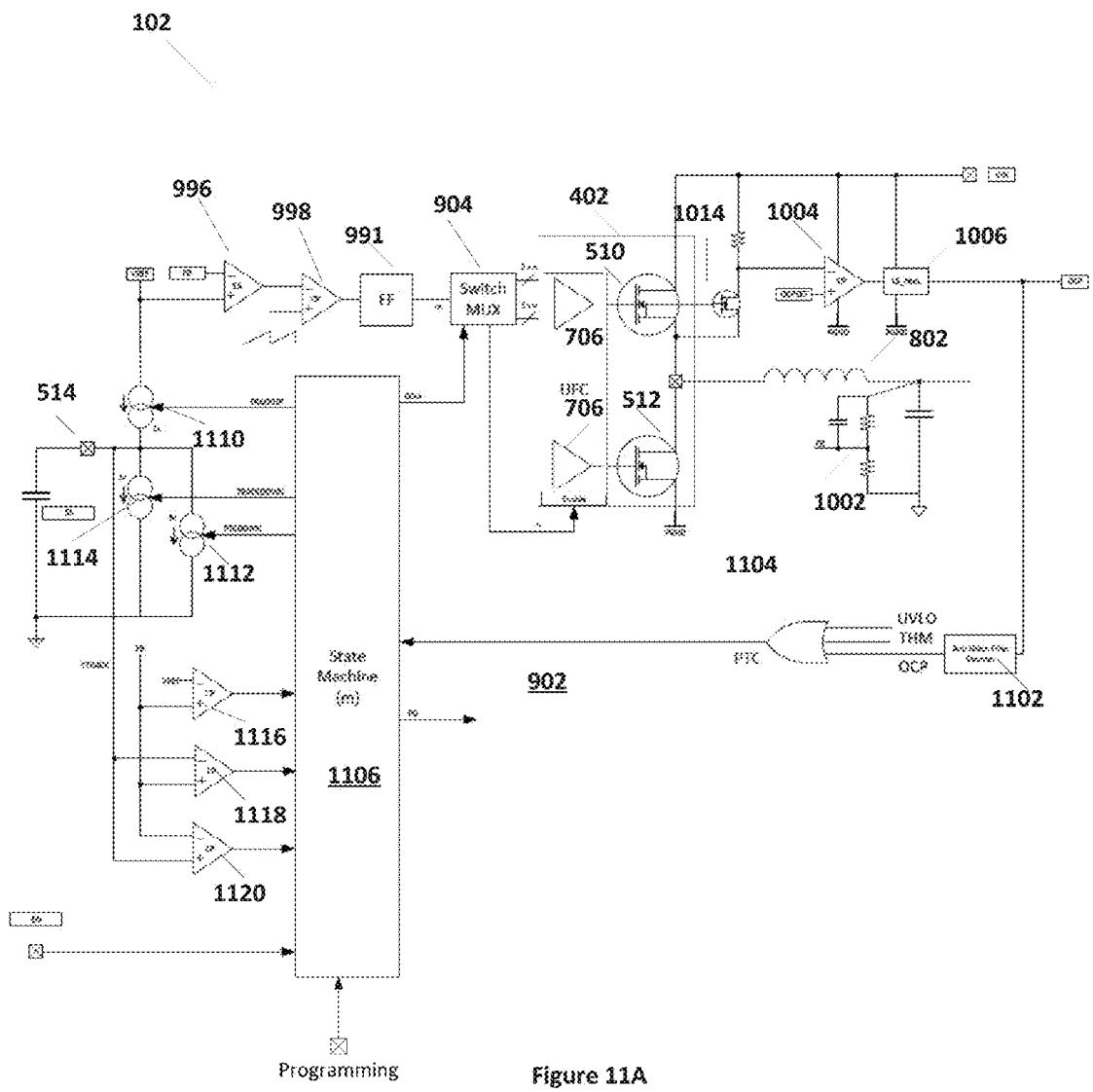
FIG. 11A illustrates an example of a cell controller with a processor.

FIG. 11A illustrates another example of controller 902 such as that illustrated in FIG. 10. As shown in FIG. 11A, controller 902 includes a processor 1106 operating a state machine. Processor 1106, which may be processor 993, provides control signals to switch matrix 904. Processor 1106 also, in response to the feedback signal FB, adjusts the reference voltage VREF that is input to error amplifier 998 up or down with digital to analog converters (DACs) 1110, 1112, and 1114. DAC 1112 provides an overall setting for VREF while DACs 1110 and 1112 allow processor 1106 to adjust the signal VREF. Comparators 1116, 1118, and 1120 provide signals to processor 1106 that reflect comparisons between VREF and the feedback signal FB. Comparator 1116 compares signal FB with VREF while comparators 1118 and 1120 compare feedback signal FB with the soft-start signal.

As is further shown in FIG. 11A, processor 1106 further receives a protection circuit signal PTC from OR gate 1104, which receives a thermal signal, an signal under-voltage lock-out signal (UVLO) and the output from anti-glitch filter counter 1102, which receives the signal OCP. Other signals may also be input to processor 1106 in order to monitor and control PMIC 102.

FIGS. 11B and 11C illustrate state function diagrams for the functioning of processor 1106 illustrated in FIG. 11A. As shown in FIG. 11B, state function 1130 begins at power up 1132. On Power-up, processor 1106 starts. State function 1130 then transitions to configuration block 1134. In configuration block 1134, PMIC 102 is configured, along with controller 902, if it has not already been configured. If no configuration of PMIC 102 is necessary, then state function 1130 executes a separate state function 1136-1 through 1136-M, where again M is the total number of channels established for PMIC 102 and m is an arbitrary one of the channels in PMIC 102. PMIC 102 may include a single processor 1106 that operates all of the channels, or may include multiple processors 1106 operating the state functions.

State function 1136 (an arbitrary one of state functions 1136-1 through 1136-M) starts in idle block 1138. In Idle block 1138, the feedback signal FB is 0 and the enable signal EN to processor 1106 is 0. When EN becomes 1, state function 1136-1 transitions to soft-start 1140. As discussed above, and as is shown in FIG. 11A, during soft-start 1140, processor 1106 monitors the feedback signal FB in comparators 1116, 1118, and 1120 while adjusting the reference voltages to error amplifier 996 until the signal FB is equal to the reference voltage.

In some cases, where the enable signal EN becomes 0 or the signal PTC from OR gate 1104 because 1 indicating an error condition, then state function 1136 transitions to shutdown 1144. Otherwise, when FB=VREF in soft-start 1140, state function 1136 transitions to the run state 1142. In run state 1142, processor 1106 monitors the operation of its assigned channel in PMIC 102. In the shutdown state 1144, processor 1106 disables functionality and returns at least channel the channel associated with state function 1136 to the idle state 1138. As is shown in FIG. 11B, shutdown 1144 transitions to Idle state 1138 when the signal FB goes to 0.

FIG. 11C is a flow chart that illustrates the configuration state 1134 illustrated in FIG. 11B. During the configuration state 1134, controllers 902, switching matrix 904, and cells 402 are configured to provide particular power requirements to device 106. As shown in FIG. 11C, configuration 1134 starts in config 1146 where configuration parameters are received into PMIC 102 from an outside data processing system 108. As shown in FIG. 11A, processor 1106 can receive programming through i/o pins 514 on PMIC 102. In step 1148, processor 1106 determines the programming mode (fuses, non-volatile memory, registers, etc.). In step 1150, each controller 902 for the M channels selected by the programming are programmed. In step 1152, switching matrix 904 for each of the M channels is programmed.

Figure 12A:
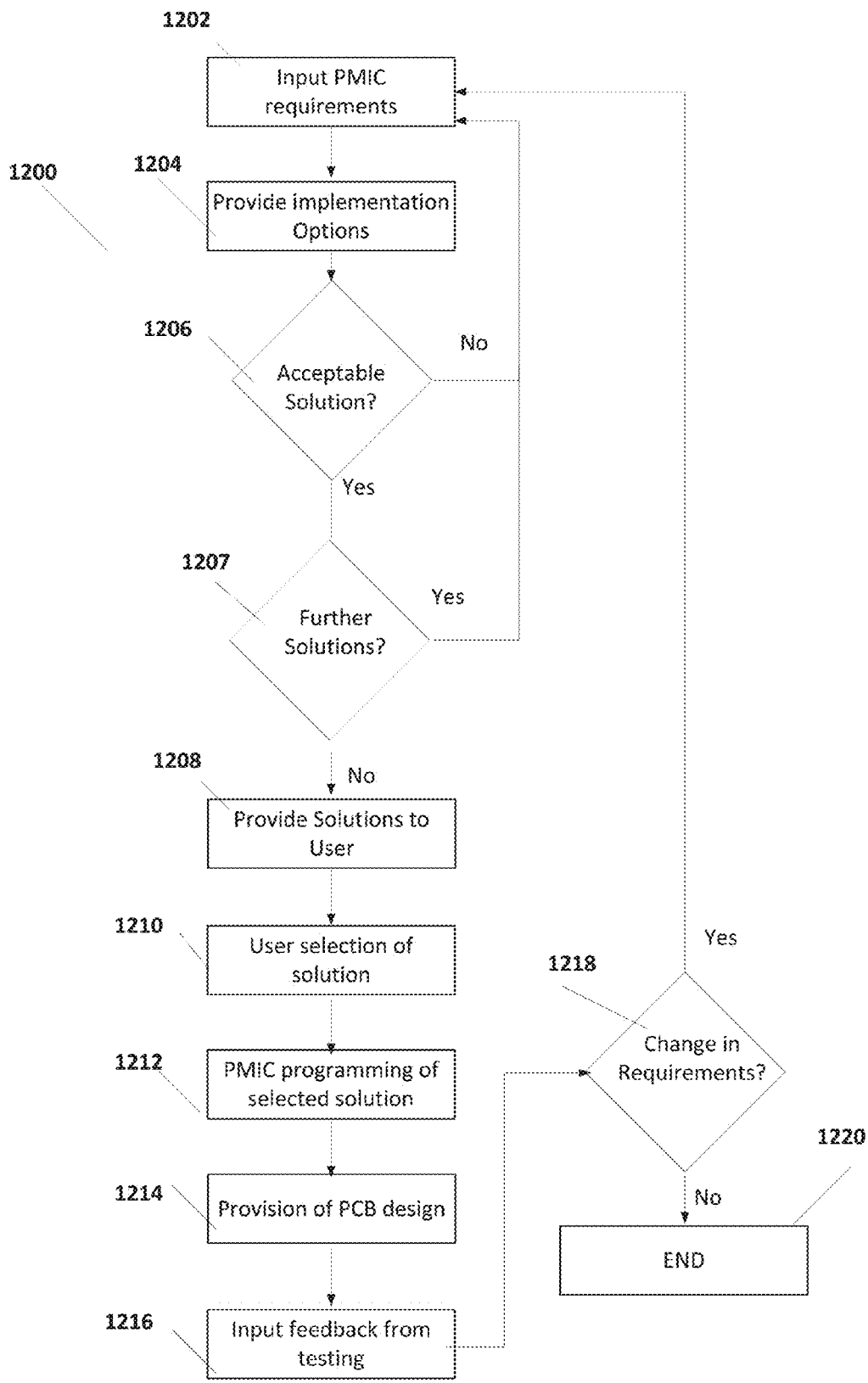
FIGS. 12A and 12B illustrate a flowchart of a method for configuring a PMIC and design of an associated printed circuit board according to some embodiments.

Referring back to FIG. 2, FIG. 12A shows an example flow chart 1200 of programming instructions operating on data processing system 108 to program a configurable PMIC system 100 with configurable PMIC 102 and PCT 104 combination. Although flow chart 1200 as illustrated in FIG.

12 is shown to include particular steps, other examples of flowchart 1200 may add, omit, and/or modify the steps shown in FIG. 12.

At step 1202 of flow chart 1200, the user may provide power and/or platform requirements for the target device 106. For example, a user may use a data processing system 108 to access a cloud-based user interface, such as in the form of a website in operative communication with a database and server-side software. Alternatively, the user may load software to the data processing system that provides the user interface.

The user interface may query and/or receive user inputs regarding power and/or platform requirements for the target device. The platform requirements data may be selected and/or inputted via a keyboard, a mouse, touch-screen, and/or via voice-recognition software. Platform requirements data may include input/output voltage ranges, size designations, efficiency, temperature, number of supplies, sequencing, slew rate, number of System on Chip (SoC) devices, and Printed Circuit Board (PCB) designs and other information. Some requirements may come from selected target device(s) 106 that are known and stored in a database. Already established values may pre-populate certain fields of the interface.

Figure 12B:
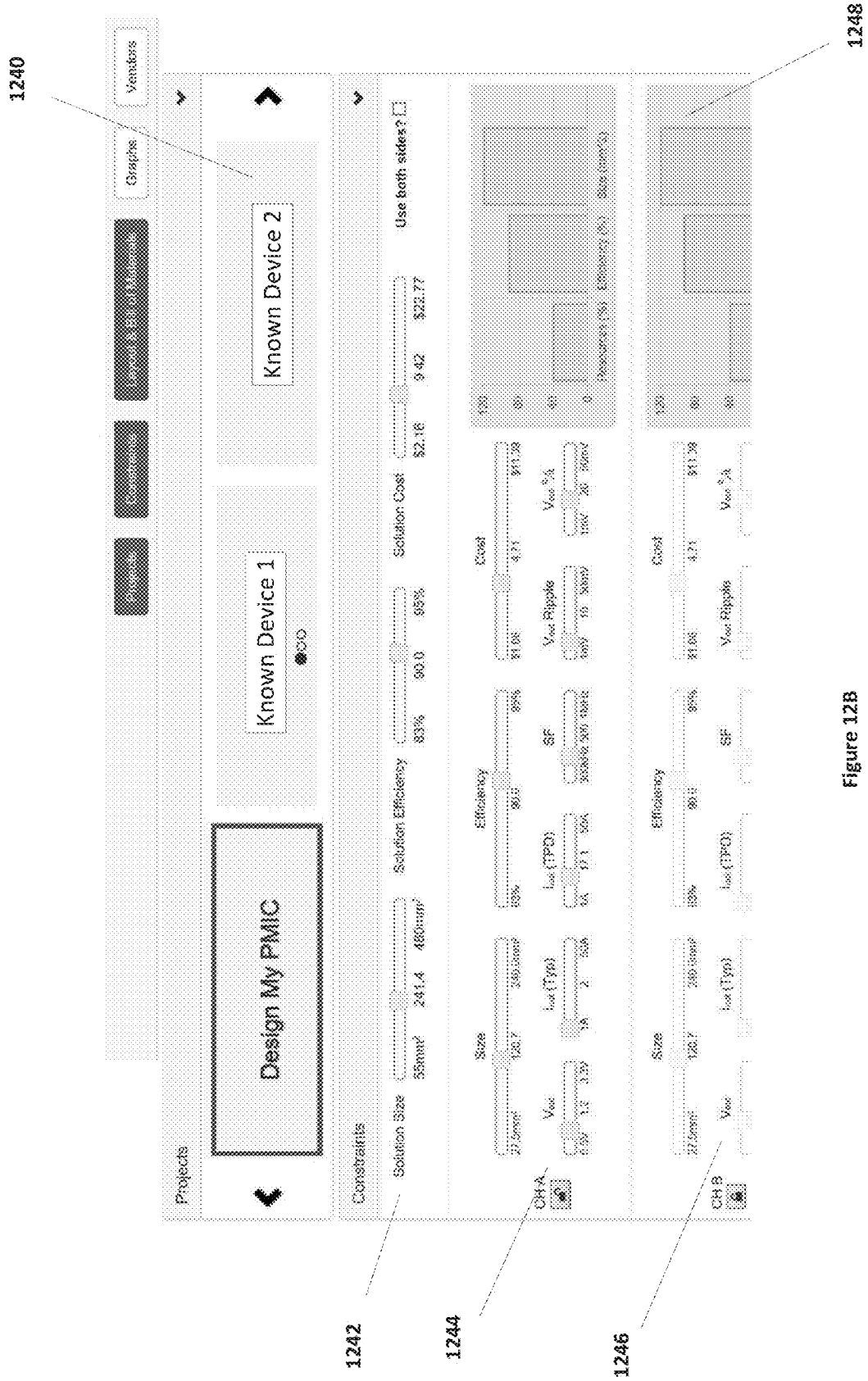

FIG. 12B illustrates and example screen shot for a user to input requirements data for the design of PMIC 102 and PCB layout 104. As illustrated in FIG. 12B, a user may select a known device from a group of devices stored in a database in block 1248. Such known devices may already have PMIC 102 and PCB 104 design solutions stored in the database. In block 1242, a user can set various global parameters such as overall solution size, solution efficiency, solution costs, and other overall chip layout. Blocks 1244 and 1246 allow the user to set and lock various parameters for each channel (channels A and B are illustrated here, but any number of channels can be included). For example, as shown in block 1244, the user can set the size, efficiency, cost, output voltage, current capabilities, switching frequencies, ripple requirements, efficiency, cost, and other settable parameters. In addition, design feedback 1248 can be provided to the user during development. Also, the user can lock a particular set of parameters so that a particular channel can be fixed while others are modified to meet the overall design restrictions determined by block 1242.

A library and/or database also may provide the requirements based on one or more of the user inputs. The library/database may include the various permutations possible for particular devices 106 and/or power requirements for devices 106. In some examples, processing system 108 may obtain data from third party websites, such as websites of known vendors, and use that data to query the user for inputs, limit user's selection of inputs, provide one or more implementation options, etc. In some examples, the user interface (and/or server-side software operating on processing system 108) may limit the user's input or selection of (or automatically select) one or more requirements based on the user's input or selection of one or more previous requirements and/or the library and/or database. For example, user's input regarding temperature requirements may limit the user's input or selection of the number of power supplies to provide, or may automatically select the number of power supplies, based on the library/database. A user may return to step 1202 at any time for further definition of the power requirements for the target device 106.

At step 1204, data processing system 108 may display and/or provide implementation options that are generated, for example, by the server-side software from the received platform requirements data. The implementation options may be based on resource availability and on the requirements of SoC devices 106, data from one or more resource libraries, user inputs, and/or other data. The options displayed may include size, efficiency, shape, height, SoC resources requirements, and/or other information. Implementation options are also determined by availability and suitable alternatives for the components that surround PMIC 102. Components, for example, can be selected in size and value to reduce the overall number of different component values and/or sizes that complete the solution.

If the implementation options are not acceptable to the user in step 1206, then the user may indicate the same via the user interface and flow chart 1200 returns to step 1202 to update one or more of the user inputs. The library/database also may update one or more of its inputs based on the updated user input(s). If the implementation options are acceptable, then the user may indicate the same via the user interface. The server-side software may generate one or more solutions for review, therefore in step 1207 the user can indicate whether or not further solutions are to be generated. If further solutions are to be generated, then flow chart 1200 returns to step 1202.

The set of solutions generated are presented to the user at step 1208. The user may select a solution from the displayed set of solutions at step 1210. Based on the selected solution, the server-side software may generate and/or produce several manufacturing and/or programming files that include programming data, which may be used by the user, a manufacturer, or other third party entity to program (or re-program) configurable PMIC 102 at step 1212. As indicated above, PMIC 102 can be programmed by sending programming data in the programming file to PMIC 102. In step 1214, processor system 1214 also generates a PCT board layout and design file for PCB 104. The combination of programming instructions for PMIC 102 and board layout for PCB 104 is the combined product that allows for the production of power for devices 106.

In some examples, the configurable PMIC 102 may be "hardened" prior to delivery to the user. Additionally, the user, a manufacturer, or other third party entity may manufacture or route (or re-wire or reroute) printed circuit board 104 based on one or more of the above files (such as a PCB layout file) at 1214. Program solutions for the configurable PMIC 102 and board layouts for PCB 104 may be delivered to the user. Part of the interface allows the user to understand the tradeoffs associated with the design inputs ahead of time.

Design feedback may be received into system 108 at step 1216. In some embodiments, the programming file for PMIC 102 generated in step 1212 and the layout file for PCB 104 generated in step 1214 may be modeled to provide expected performance characteristics input for the system. In some embodiment, the results of physical testing of a PMIC 102 and PCB 104 produced using the programming file and the PCB layout can input in step 1216. Such data may indicate further changes to the parameters and requirements of PMIC 102 and PCB 104. Modeling, testing, and redesigning of PMIC 102 and PCB 104 with process 1200 can proceed until a finalized design is reached.

When a change in power and/or platform requirement for the target device 106 occurs at step 1218, which may be the result of user feedback received in step 1216 or the result of a redesign of device 106, the above steps 1202-1214 may be repeated to obtain a new configurable PMIC program file and/or PCB layout design that will meet the new platform requirements. In some examples, a new configurable PMIC 102 may be manufactured with the programming instructions and in some embodiments PMIC 102 may be reprogrammed with the new programming. Additionally, a new PCB 104 may be manufactured instead of re-wiring the previous PCB 104 to accommodate a new board layout.

In some examples, a user may instead reprogram configurable PMIC 102 by connecting the same with the data processing system 108 after the solutions files have been generated by the server-side software. If necessary, the user may send the PCB 104 for rerouting or replacement based on the generated PCB layout files and/or other generated files.

Figure 13:
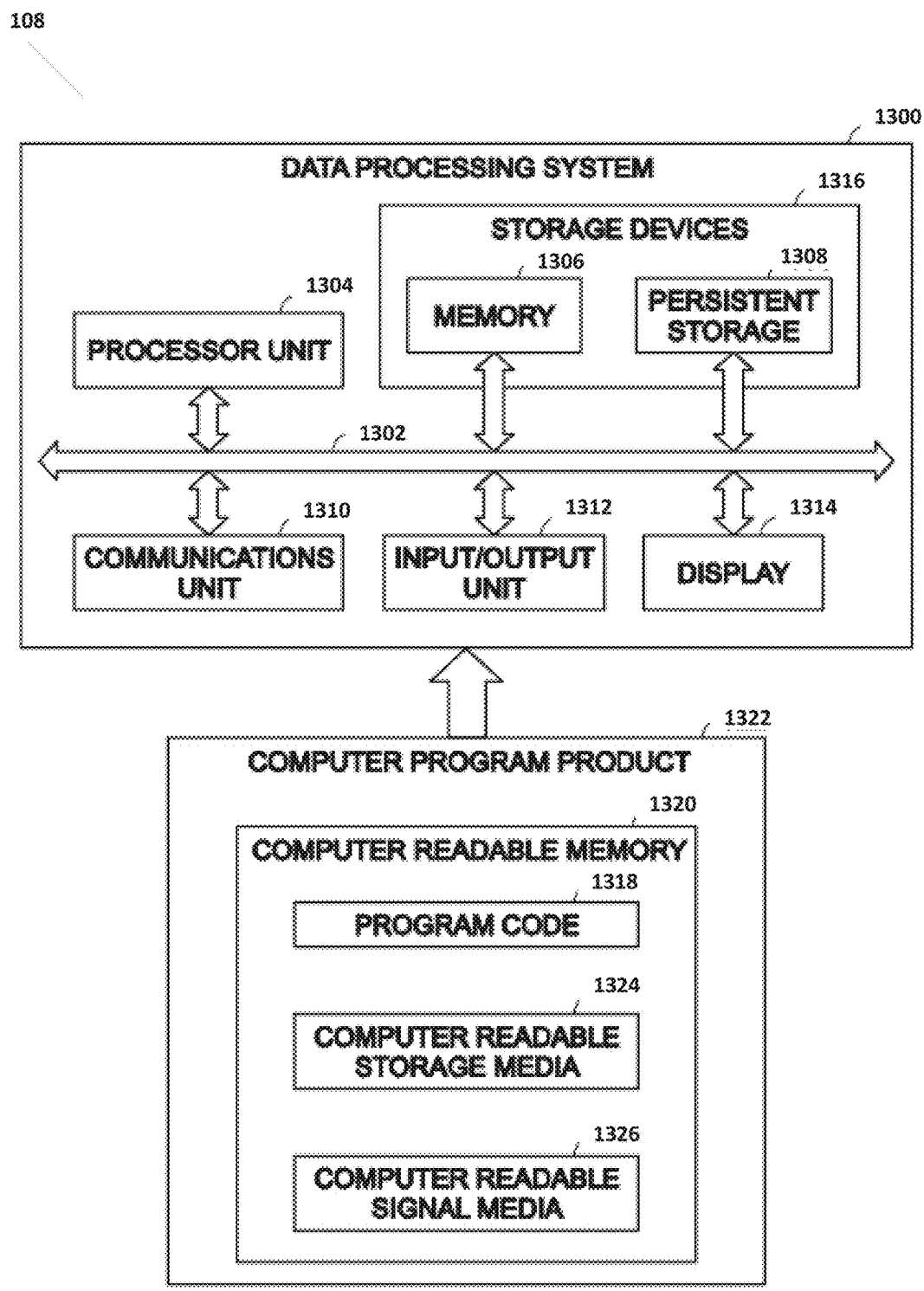
FIG. 13 illustrates a block diagram of an example data processing system used to configure a PMIC according as discussed with FIG. 12 according to some embodiments.

Data processing system 108 is generally depicted in FIG. 13. As discussed above, data processing system 108 may be used for receiving platform requirements from the user, presenting options to the user, generating solutions for the user, receiving user selection of a solution, programming (or reprogramming) the PMIC 102 based on the selected solution, creating a PCB implementation layout based on the selected solution, etc. In this illustrative example, data processing system 108 includes processor 1300 and communications framework 1302. Communications framework 1302 provides communications between processor unit 1304, memory 1306, persistent storage 1308, communications unit 1310, input/output (I/O) unit 1312, and display 1314. Memory 1306, persistent storage 1308, communications unit 1310, input/output (I/O) unit 1312, and display 1314 are examples of resources accessible by processor unit 1304 via communications framework 1302.

Processor unit 1304 serves to run instructions that may be loaded into memory 1306. Processor unit 1304 may be a number of processors, a multi-processor core, or some other type of processor, depending on the particular implementation. Further, processor unit 1304 may be implemented using a number of heterogeneous processor systems in which a main processor is present with secondary processors on a single chip. As another illustrative example, processor unit 1304 may be a symmetric multi-processor system containing multiple processors of the same type.

Memory 1306 and persistent storage 1308 are examples of storage devices 1316. A storage device is any piece of hardware that is capable of storing information, such as, for example, without limitation, data, program code in functional form, and other suitable information either on a temporary basis or a permanent basis.

Storage devices 1316 also may be referred to as computer readable storage devices in these examples. Memory 1306, in these examples, may be, for example, a random access memory or any other suitable volatile or non-volatile storage device. Persistent storage 908 may take various forms, depending on the particular implementation.

For example, persistent storage 1308 may contain one or more components or devices. For example, persistent storage 1308 may be a hard drive, a flash memory, a rewritable optical disk, a rewritable magnetic tape, or some combination of the above. The media used by persistent storage 1308 also may be removable. For example, a removable hard drive may be used for persistent storage 1308.

Communications unit 1310, in these examples, provides for communications with other data processing systems or devices. In these examples, communications unit 1310 is a network interface card. Communications unit 1310 may provide communications through the use of either or both physical and wireless communications links.

Input/output (I/O) unit 1312 allows for input and output of data with other devices that may be connected to data processing system 1300. For example, input/output (I/O) unit 1312 may provide a connection for user input through a keyboard, a mouse, and/or some other suitable input device. Further, input/output (I/O) unit 1312 may send output to a printer. Display 1314 provides a mechanism to display information to a user.

Instructions for the operating system, applications, and/or programs may be located in storage devices 1316, which are in communication with processor unit 1304 through communications framework 1302. In these illustrative examples, the instructions are in a functional form on persistent storage 1308. These instructions may be loaded into memory 1306 for execution by processor unit 1304. The processes of the different embodiments may be performed by processor unit 1304 using computer-implemented instructions, which may be located in a memory, such as memory 1306.

These instructions are referred to as program instructions, program code, computer usable program code, or computer readable program code that may be read and executed by a processor in processor unit 1304. The program code in the different embodiments may be embodied on different physical or computer readable storage media, such as memory 1306 or persistent storage 1308.

Program code 1318 is located in a functional form on computer readable media 1320 that is selectively removable and may be loaded onto or transferred to data processing system 1300 for execution by processor unit 1304. Program code 1318 and computer readable media 1320 form computer program product 1322 in these examples. In one example, computer readable media 1320 may be computer readable storage media 1324 or computer readable signal media 1326.

Computer readable storage media 1324 may include, for example, an optical or magnetic disk that is inserted or placed into a drive or other device that is part of persistent storage 1308 for transfer onto a storage device, such as a hard drive, that is part of persistent storage 1308. Computer readable storage media 1324 also may take the form of a persistent storage, such as a hard drive, a thumb drive, or a flash memory, that is connected to data processing system 1300. In some instances, computer readable storage media 1324 may not be removable from data processing system 1300.

In these examples, computer readable storage media 1324 is a physical or tangible storage device used to store program code 1318 rather than a medium that propagates or transmits program code 1318. Computer readable storage media 1324 is also referred to as a computer readable tangible storage device or a computer readable physical storage device. In other words, computer readable storage media 1324 is a media that can be touched by a person.

Alternatively, program code 1318 may be transferred to data processing system 900 using computer readable signal media 1326. Computer readable signal media 1326 may be, for example, a propagated data signal containing program code 1318. For example, computer readable signal media 1326 may be an electromagnetic signal, an optical signal, and/or any other suitable type of signal. These signals may be transmitted over communications links, such as wireless communications links, optical fiber cable, coaxial cable, a wire, and/or any other suitable type of communications link. In other words, the communications link and/or the connection may be physical or wireless in the illustrative examples.

In some illustrative embodiments, program code 1318 may be downloaded over a network to persistent storage 1308 from another device or data processing system through computer readable signal media 1326 for use within data processing system 1300. For instance, program code stored in a computer readable storage medium in a server data processing system may be downloaded over a network from the server to data processing system 1300. The data processing system providing program code 1318 may be a server computer, a client computer, or some other device capable of storing and transmitting program code 1318.

The different components illustrated for data processing system 1300 are not meant to provide architectural limitations to the manner in which different embodiments may be implemented. The different illustrative embodiments may be implemented in a data processing system including components in addition to and/or in place of those illustrated for data processing system 1300. Other components shown in FIG. 13 can be varied from the illustrative examples shown. The different embodiments may be implemented using any hardware device or system capable of running program code. As one example, data processing system 1300 may include organic components integrated with inorganic components and/or may be comprised entirely of organic components excluding a human being. For example, a storage device may be comprised of an organic semiconductor.

In another illustrative example, processor unit 1304 may take the form of a hardware unit that has circuits that are manufactured or configured for a particular use. This type of hardware may perform operations without needing program code to be loaded into a memory from a storage device to be configured to perform the operations.

For example, when processor unit 1304 takes the form of a hardware unit, processor unit 1304 may be a circuit system, an application specific integrated circuit (ASIC), a programmable logic device, or some other suitable type of hardware configured to perform a number of operations. With a programmable logic device, the device is configured to perform the number of operations. The device may be reconfigured at a later time or may be permanently configured to perform the number of operations. Examples of programmable logic devices include, for example, a programmable logic array, a field programmable logic array, a field programmable gate array, and other suitable hardware devices. With this type of implementation, program code 1318 may be omitted, because the processes for the different embodiments are implemented in a hardware unit.

In still another illustrative example, processor unit 1304 may be implemented using a combination of processors found in computers and hardware units. Processor unit 1304 may have a number of hardware units and a number of processors that are configured to run program code 1318. With this depicted example, some of the processes may be implemented in the number of hardware units, while other processes may be implemented in the number of processors.

In another example, a bus system may be used to implement communications framework 1302 and may be comprised of one or more buses, such as a system bus or an input/output bus. Of course, the bus system may be implemented using any suitable type of architecture that provides for a transfer of data between different components or devices attached to the bus system.

Additionally, communications unit 1310 may include a number of devices that transmit data, receive data, or both transmit and receive data. Communications unit 1310 may be, for example, a modem or a network adapter, two network adapters, or some combination thereof. Further, a memory may be, for example, memory 1306, or a cache, such as that found in an interface and memory controller hub that may be present in communications framework 1302. Data processing system 1300 may sometimes be referred to as an "electronic apparatus."

The flowcharts and block diagrams described herein illustrate the architecture, functionality, and operation of possible implementations of systems, methods, and computer program products according to various illustrative embodiments. In this regard, each block in the flowcharts or block diagrams may represent a module, segment, or portion of code, which comprises one or more executable instructions for implementing the specified logical function or functions. It should also be noted that, in some alternative implementations, the functions noted in a block may occur out of the order noted in the drawings. For example, the functions of two blocks shown in succession may be executed substantially concurrently, or the functions of the blocks may sometimes be executed in the reverse order, depending upon the functionality involved.

The specific embodiments as disclosed and illustrated herein are not to be considered in a limiting sense as numerous variations are possible. The subject matter of the inventions includes all novel and non-obvious combinations and subcombinations of the various elements, features, functions and/or properties disclosed herein. Similarly, where any claim recites "a" or "a first" element or the equivalent thereof, such claim should be understood to include incorporation of one or more such elements, neither requiring nor excluding two or more such elements.

The above detailed description is provided to illustrate specific embodiments of the present invention and is not intended to be limiting. Numerous variations and modifications within the scope of the present invention are possible. The present invention is set forth in the following claims.

What is claimed is:

1. A method of providing a power management system, comprising:
   receiving power requirements corresponding to a target device;
   providing implementation options to achieve the power requirements;
   selecting a solution from the implementation options;
   generating a programming file for a power management integrated circuit, the power management integrated circuit including:
      a plurality of cells, each cell including a pair of series-coupled switching elements, and
      a switch matrix and controller coupled to the plurality of cells, the switch matrix and controller configured to couple one or more of the plurality of cells together to form one or more individual power channels in response to programming signals, each power channel including at least one cell of the plurality of cells; and
   generating a printed circuit board design for the power management integrated circuit.

2. The method of claim 1, wherein each power channel is coupled to components mounted on the printed circuit board in the printed circuit board design to provide a rail to a target device.

3. The method of claim 1, wherein the power management integrated circuit further includes at least one driver coupled to each switching element in the pair of series-coupled switching elements.

4. The method of claim 3, wherein each driver of the at least one driver includes an amplifier and a slew-rate adjust circuit.

5. The method of claim 3, wherein an output signal from each driver of the at least one driver is switchably output to an I/O pin of the power management integrated circuit.

6. The method of claim 5, wherein the output signal from each drive is coupled to an external switching device.

7. The method of claim 6, wherein the cell further includes a programmable element that is configurable to couple the output signal from the driver to an I/O pin of the power management integrated circuit or to couple the output signal from the driver to the external switching device.

8. The method of claim 1, wherein at least one of the pair of series-coupled switching devices is an FET, the source and drain of which are coupled to I/O pins.

9. The method of claim 8, wherein the FET includes a plurality of individual FETs and the switching device can be programmed to include any of the plurality of individual FETs.

10. The method of claim 9, wherein each cell is configurable to adjust performance of the cell.

11. The method of claim 1, wherein each the pair of series-coupled switching elements includes a higher switching element and a lower switching element.

12. The method of claim 11, wherein the higher switching element is a high FET and the at least one driver includes a high driver coupled to the high FET and the lower switching element is a low FET and the at least one driver includes a low driver coupled to the low FET.

13. The method of claim 12, wherein the high FET and the low FET are coupled in series to provide an output signal between the high FET and the low FET.

14. The method of claim 13, wherein the output signals from multiple cells are combined to complete a buck converter.

15. The method of claim 11, wherein the lower switching element is a diode.

16. The method of claim 11, wherein the higher switching element is a diode.

17. The method of claim 11, wherein the switch matrix and control block includes a plurality of controllers coupled to a switch matrix.

18. The method of claim 13, wherein the output signals from multiple cells are combined to complete a buck/boost converter.

19. The method of claim 13, wherein multiple cells are coupled as a cascode.

20. The method of claim 17, wherein the switch matrix is programmable to establish one or more power channels, each power channel including one or more cells, a switching matrix, and an assigned controller.

21. The method of claim 20, wherein the higher switching element is a high FET and the lower switching element is a low FET and wherein the switch matrix for each power channel includes:
a high programmable logic circuit that determines whether a gate voltage of one or more of the high FETs of cells included in the power channel is a high voltage;
a low programmable logic circuit that determines whether a gate voltage of one or more of the low FETs of cells included in the power channel is a high voltage;
a non-overlap circuit that receives a high logic signal from the high programmable logic circuit, a low logic signal from the low programmable logic circuit, and a pulse-wave signal from the assigned controller from the plurality of controllers and provides a high gate signal and a low gate signal;
a high gate output circuit that provides a high gate signal to the high element of each cell included in the power channel; and
a low gate output circuit that provides a low gate signal to the low element of each cell included in the power channel.

22. The method of claim 21, wherein the switching matrix further includes a multiplexer that receives pulse-wave signals from more than one of the plurality of controllers, the multiplexer capable of dynamically selecting from the more than one controller to provide the pulse-wave signal to the non-overlap block.

23. The method of claim 22, wherein the control circuit includes a processor operating a state machine.

24. The method of claim 23, wherein the state machine includes a configuration state where programming instructions are received for each power channel.

25. The method of claim 23, wherein the state machine includes a channel state machine for each of the power channels, the channel state machine including:
an idle state where a feedback signal is zero and the circuit is not enabled;
a soft-start state that is transitioned to from the idle state when the circuit becomes enabled, the soft-start state operating the circuit to raise the feedback signal to a reference value;
a run state that is transitioned to from the soft-start state when the feedback signal is the reference signal, the run state operating the circuit to produce power on the power channel; and
a shut-down state that is transitioned to whenever the circuit becomes not enabled or an error condition is detected.

26. The method of claim 20, wherein the controller includes:
an error amplifier that receives a feedback signal from the output signal from the power channel and provides an error signal;
a ramp generator that provides a ramp voltage;
a comparator that compares the ramp voltage with the error signal to form a compared signal;
an oscillator that provides a pulse signal;
a logic circuit that receives the pulse signal and the compare signal and provides a logic signal; and
a flip-flop that receives the logic signal and provides a pulse-wave signal to the switch matrix.

27. The method of claim 26, wherein the controller further includes a voltage reference generator that generates a reference voltage for the error amplifier.

28. The method of claim 26, wherein the logic circuit receives an on-time pulse and an off-time pulse from the oscillator.

29. The method of claim 26, wherein the controller further includes a thermal sensor input to the logic circuit.

30. The method of claim 26, wherein the controller further includes an over-current protection signal input to the logic circuit.

31. The method of claim 1, wherein the power management integrated circuit includes programmable elements that are programmed to form the at least one power channel.

32. The method of claim 31, wherein the programmable elements include one or more of non-volatile memory, registers, and fuses.

33. The method of claim 32, wherein the programmable elements are programmed to determine operation of each power channel in the circuit.

34. The method of claim 1, further including programming the power management integrated circuit with the programming file.

35. The method of claim 1, further including receiving new power requirements corresponding to a redefined target device and generating a new programming file and new printed circuit board design.

36. The method of claim 35, wherein new power requirements result from analysis of a system based on the programming file and the printed circuit design.

\* \* \* \* \*